(12) United States Patent
Talati et al.

(10) Patent No.: US 10,542,596 B1
(45) Date of Patent: Jan. 21, 2020

(54) LOW POWER PULSE WIDTH MODULATION BY CONTROLLING BITS ORDER

(71) Applicant: Facebook Technologies, LLC, Menlo Park, CA (US)

(72) Inventors: Sharvil Shailesh Talati, Seattle, WA (US); Ilias Pappas, Cork (IE)

(73) Assignee: Facebook Technologies, LLC, Menlo Park, CA (US)

( * ) Notice: Subject to any disclaimer, the term of this patent is extended or adjusted under 35 U.S.C. 154(b) by 0 days.

(21) Appl. No.: 16/020,803

(22) Filed: Jun. 27, 2018

Related U.S. Application Data

(60) Provisional application No. 62/531,736, filed on Jul. 12, 2017.

(51) Int. Cl.
*H05B 33/08* (2006.01)
*H04N 9/68* (2006.01)
*H04N 9/31* (2006.01)

(52) U.S. Cl.
CPC ........... *H05B 33/0818* (2013.01); *H04N 9/68* (2013.01); *H05B 33/0845* (2013.01); *G09G 2300/0866* (2013.01); *G09G 2310/027* (2013.01); *G09G 2310/0264* (2013.01); *G09G 2320/00* (2013.01); *G09G 2330/00* (2013.01); *H04N 9/3111* (2013.01); *H04N 9/3123* (2013.01); *H04N 9/3197* (2013.01)

(58) Field of Classification Search
CPC ... G09G 2300/0828; G09G 2300/0842; G09G 2300/0866; G09G 2310/0259; G09G 2310/027; G09G 2310/0289; G09G 2310/08; G09G 2320/0247; G09G 2320/0276; G09G 2330/021; G09G 3/2011; G09G 3/2014; G09G 3/2022; G09G 3/2077; G09G 3/2092; G09G 3/22; G09G 3/32; G09G 3/3225; G09G 3/3688; G09G 5/008; H05B 33/0818; H05B 33/0845
See application file for complete search history.

(56) References Cited

U.S. PATENT DOCUMENTS 5,319,491 A * 6/1994 Selbrede .................. G02B 6/00
345/206
6,362,835 B1 * 3/2002 Urbanus .................. G09G 3/20
345/692

(Continued)

*Primary Examiner* — Renan Luque
(74) *Attorney, Agent, or Firm* — Fenwick & West LLP

(57) ABSTRACT

An electronic display uses pulse-width modulation (PWM) to drive light emitting devices (LEDs) with reduced power consumption. A modified digital word including a modified sequence of bits is generated by modifying a bit sequence of a greyscale value for a sub-pixel. The modified bit sequence includes fewer transitions from a first voltage level to a second voltage level higher than the first voltage level than the bit sequence of the grayscale value. A modified sequence of pulses is generated based on ordering pulses of the PWM signal according to the modified bit sequence. The modified digital word and the modified sequence of pulses are used to control a light emitting device of the electronic display. The reduction in voltage level transitions results in reduced charging of a storage capacitor in the control circuit for the LED, while maintaining brightness level as specified by grayscale value.

20 Claims, 16 Drawing Sheets

(56) References Cited

U.S. PATENT DOCUMENTS

| | | | |
|---|---|---|---|
| 2002/0027541 A1* | 3/2002 | Cairns | G09G 3/3611 345/87 |
| 2008/0158211 A1* | 7/2008 | Kwon | G01J 1/32 345/207 |
| 2013/0235273 A1* | 9/2013 | Van Ostrand | H04N 9/3111 348/645 |
| 2015/0015616 A1* | 1/2015 | Buckley | G09G 3/30 345/690 |
| 2016/0226006 A1* | 8/2016 | Otsu | H05B 33/14 |

* cited by examiner

LOW POWER PULSE WIDTH MODULATION BY CONTROLLING BITS ORDER

CROSS REFERENCE TO RELATED APPLICATION

This application claims the benefit under 35 U.S.C. § 119(e) to U.S. Provisional Patent Application No. 62/531,736, titled "Low Power Pulse Width Modulation by Controlling Bits Order," filed Jul. 12, 2017, which is incorporated by reference in its entirety.

BACKGROUND

The present disclosure generally relates to reducing dynamic power consumption in pixels of electronic displays.

Electronic displays use sub-pixels or pixels (formed from multiple sub-pixels) to provide images to a user. For example, each sub-pixel may include a control circuit with a storage capacitor connected to a gate of a driving transistor for a light source. Dynamic power use in the control circuit is increased when the storage capacitor is increasingly charged and discharged during operation of the electronic display.

SUMMARY

Embodiments relate to reducing dynamic power consumptions in sub-pixels of an electronic display. In some embodiments, the electronic display includes a display panel, a panel driver, a pulse-width modulation (PWM) driver, and a processor. The processor associates each bit of a grayscale value for a sub-pixel with a pulse of a PWM signal including a sequence of pulses. A modified digital word including a modified bit sequence is generated by modifying a bit sequence of the grayscale value. The modified bit sequence includes a fewer number of transitions from a first voltage level (e.g., corresponding with bit value 0) to a second voltage level (e.g., corresponding with bit value 1) higher than the first voltage level as defined from a least significant bit to a most significant bit than the bit sequence of the grayscale value. A modified PWM signal including a modified sequence of pulses is generated by ordering the pulses of the PWM signal according to the modified bit sequence of the modified digital word and the associations between each bit of the grayscale value and each pulse of the sequence of pulses of the PWM signal. The modified digital word is provided to the display panel via the panel driver, and the modified PWM signal is provided to the display panel via the PWM driver.

Some embodiments relate to controlling an electronic display. Each bit of a grayscale value for a sub-pixel of a display panel of the electronic display is associated with a pulse of a pulse-width modulation (PWM) signal. The PWN signal includes a sequence of pulses. A modified digital word including a modified bit sequence is generated by modifying a bit sequence of the grayscale value. The modified bit sequence includes a fewer number of transitions from a first voltage level to a second voltage level higher than the first voltage level as defined from a least significant bit to a most significant bit than the bit sequence of the grayscale value. A modified PWM signal including a modified sequence of pulses is generated based on ordering the pulses of the PWM signal according to the modified bit sequence of the modified digital word and the associations between each bit of the grayscale value and each pulse of the sequence of pulses of the PWM signal. The modified digital word is provided to the display panel via a panel driver. The modified PWM signal is provided to the display panel via a PWM driver.

Some embodiments include a head-mounted display (HMD) including the electronic display. Other aspects include components, devices, systems, improvements, methods, processes, applications, computer readable mediums, and other technologies related to any of the above.

BRIEF DESCRIPTION OF THE DRAWINGS

Figure (FIG.) 1 is a block diagram illustrating a system associated with a head-mounted display (HMD), in accordance with one embodiment.

The figures depict embodiments of the present disclosure for purposes of illustration only.

DETAILED DESCRIPTION

Embodiments relate to an electronic display that uses pulse-width modulation (PWM) to drive light emitting devices (LEDs) with improved power consumption. For each sub-pixel of a display, a gray scale value is generated that corresponds to a brightness level for the sub-pixel. A modified digital word including a modified sequence of bits is generated by modifying a bit sequence of a greyscale value for a sub-pixel. The modified bit sequence includes fewer transitions from a lower voltage level to a higher voltage level than the bit sequence of the grayscale value. A modified sequence of pulses is generated based on ordering pulses of the PWM signal according to the modified bit sequence, and using the associations between bits of the grayscale value and pulses of the sequence of pulses of the PWM signal. The modified digital word and the modified sequence of pulses are used to control a light emitting device of the electronic display. The reduction in voltage level transitions results in reduced charging of a storage capacitor in the control circuit for the LED, maintaining brightness level as specified by the grayscale value and improving dynamic power consumption.

Figure 1:
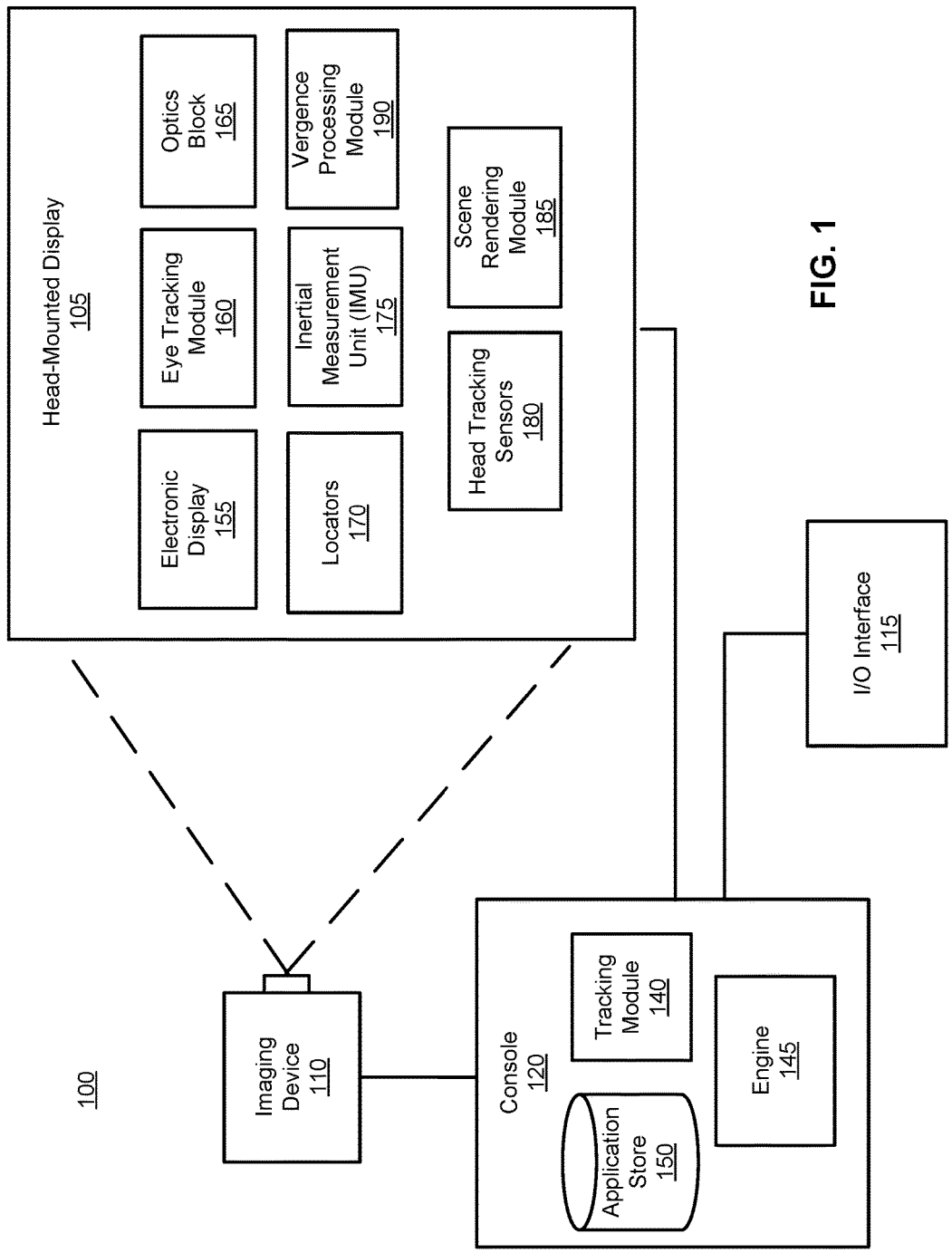

FIG. 1 shows a system 100 including a head-mounted display (HMD). The system 100 may be for use as a virtual reality (VR) system, an augmented reality (AR) system, a mixed reality (MR) system, or some combination thereof. In this example, the system 100 includes a HMD 105, an imaging device 110, and an input/output (I/O) interface 115, which are each coupled to a console 120. While FIG. 1 shows a single HMD 105, a single imaging device 110, and an I/O interface 115, in other embodiments, any number of these components may be included in the system. For example, there may be multiple HMDs 105 each having an associated input interface 115 and being monitored by one or more imaging devices 110, with each HMD 105, I/O interface 115, and imaging devices 110 communicating with the console 120. In alternative configurations, different and/or additional components may also be included in the system 100. The HMD 105 may act as a VR, AR, and/or a MR HMD. An MR and/or AR HMD augments views of a physical, real-world environment with computer-generated elements (e.g., images, video, sound, etc.).

The HMD 105 presents content to a user. Example content includes images, video, audio, or some combination thereof. Audio content may be presented via a separate device (e.g., speakers and/or headphones) external to the HMD 105 that receives audio information from the HMD 105, the console 120, or both. The HMD 105 includes an electronic display 155, an eye tracking module 160, an optics block 165, one or more locators 170, an internal measurement unit (IMU) 175, head tracking sensors 180, and a scene rendering module 185, and a vergence processing module 190.

The electronic display 155 includes sub-pixels that are driven by a pulse-width modulation (PWM) signal. For each pixel time, the PWM signal has a series of pulses, each pulse is selectively used to drive a lighting device or not based on a sequence of bits referred to herein as a "digital word." The PWM signal is provided to a control circuit for each sub-pixel to drive a light emitting device (e.g., a diode). As discussed in further detail below with reference to FIG. 11, the sequence of bits of the digital word is modified to reduce charging and discharging of a capacitor in the control circuit of each sub-pixel. Among other things, the greyscale or brightness of each sub-pixel is maintained while dynamic power use is reduced.

In some embodiments, the electronic display 155 provides a display of gaze contingent content concurrent with eye position detection. The detection of eye tracking information is used as an input to generate (e.g., a subsequent video frame) of gaze contingent content.

The optics block 165 adjusts its focal length responsive to instructions from the console 120. In some embodiments, the optics block 165 includes a multi multifocal block to adjust a focal length (adjusts optical power) of the optics block 165.

The eye tracking module 160 tracks an eye position and eye movement of a user of the HMD 105. The light detectors of the electronic display 155 (e.g., or elsewhere in the HMD 105) capture image information of a user's eyes, and the eye tracking module 160 uses the captured information to determine eye tracking information such as the focus area and non-focus area(s) of the user's eyes on a display panel, interpupillary distance, interocular distance, a three-dimensional (3D) position of each eye relative to the HMD 105 (e.g., for distortion adjustment purposes), including a magnitude of torsion and rotation (i.e., roll, pitch, and yaw) and gaze directions for each eye. The information for the position and orientation of the user's eyes is used to determine the gaze point in a virtual scene presented by the HMD 105 where the user is looking.

The vergence processing module 190 determines a vergence depth of a user's gaze based on the gaze point or an estimated intersection of the gaze lines determined by the eye tracking module 160. Vergence is the simultaneous movement or rotation of both eyes in opposite directions to maintain single binocular vision, which is naturally and automatically performed by the human eye. Thus, a location where a user's eyes are verged is where the user is looking and is also typically the location where the user's eyes are focused. For example, the vergence processing module 190 triangulates the gaze lines to estimate a distance or depth from the user associated with intersection of the gaze lines. The depth associated with intersection of the gaze lines can then be used as an approximation for the accommodation distance, which identifies a distance from the user where the user's eyes are directed. Thus, the vergence distance allows determination of a location where the user's eyes should be focused.

The locators 170 are objects located in specific positions on the HMD 105 relative to one another and relative to a specific reference point on the HMD 105. A locator 170 may be a light emitting diode (LED), a corner cube reflector, a reflective marker, a type of light source that contrasts with an environment in which the HMD 805 operates, or some combination thereof. Active locators 170 (i.e., an LED or other type of light emitting device) may emit light in the visible band (~380 nm to 850 nm), in the infrared (IR) band (~850 nm to 1 mm), in the ultraviolet band (10 nm to 380 nm), some other portion of the electromagnetic spectrum, or some combination thereof.

The locators 170 can be located beneath an outer surface of the HMD 105, which is transparent to the wavelengths of light emitted or reflected by the locators 170 or is thin enough not to substantially attenuate the wavelengths of light emitted or reflected by the locators 170. Further, the outer surface or other portions of the HMD 105 can be opaque in the visible band of wavelengths of light. Thus, the locators 170 may emit light in the IR band while under an outer surface of the HMD 105 that is transparent in the IR band but opaque in the visible band.

The IMU 175 is an electronic device that generates fast calibration data based on measurement signals received from one or more of the head tracking sensors 180, which generate one or more measurement signals in response to motion of HMD 105. Examples of the head tracking sensors 180 include accelerometers, gyroscopes, magnetometers, other sensors suitable for detecting motion, correcting error associated with the IMU 175, or some combination thereof. The head tracking sensors 180 may be located external to the IMU 175, internal to the IMU 175, or some combination thereof.

Based on the measurement signals from the head tracking sensors 180, the IMU 175 generates fast calibration data indicating an estimated position of the HMD 105 relative to an initial position of the HMD 105. For example, the head tracking sensors 180 include multiple accelerometers to measure translational motion (forward/back, up/down, left/right) and multiple gyroscopes to measure rotational motion (e.g., pitch, yaw, and roll). The IMU 175 can, for example, rapidly sample the measurement signals and calculate the estimated position of the HMD 105 from the sampled data. For example, the IMU 175 integrates measurement signals received from the accelerometers over time to estimate a velocity vector and integrates the velocity vector over time to determine an estimated position of a reference point on the HMD 105. The reference point is a point that may be used to describe the position of the HMD 105. While the reference point may generally be defined as a point in space, in various embodiments, a reference point is defined as a point within the HMD 105 (e.g., a center of the IMU 175). Alternatively, the IMU 175 provides the sampled measurement signals to the console 120, which determines the fast calibration data.

The IMU 175 can additionally receive one or more calibration parameters from the console 120. As further discussed below, the one or more calibration parameters are used to maintain tracking of the HMD 105. Based on a received calibration parameter, the IMU 175 may adjust one or more of the IMU parameters (e.g., sample rate). In some embodiments, certain calibration parameters cause the IMU 175 to update an initial position of the reference point to correspond to a next calibrated position of the reference point. Updating the initial position of the reference point as the next calibrated position of the reference point helps reduce accumulated error associated with determining the estimated position. The accumulated error, also referred to as drift error, causes the estimated position of the reference point to "drift" away from the actual position of the reference point over time.

The scene rendering module 185 receives content for the virtual scene from an engine 145 and provides the content for display on the electronic display 155. Additionally, the scene rendering module 185 can adjust the content based on information from the IMU 175, the vergence processing module 830, and the head tracking sensors 180. The scene rendering module 185 determines a portion of the content to be displayed on the electronic display 155 based on one or more of the tracking module 140, the head tracking sensors 180, or the IMU 175.

The imaging device 110 generates slow calibration data in accordance with calibration parameters received from the console 120. Slow calibration data includes one or more images showing observed positions of the locators 125 that are detectable by imaging device 110. The imaging device 110 may include one or more cameras, one or more video cameras, other devices capable of capturing images including one or more locators 170, or some combination thereof. Additionally, the imaging device 110 may include one or more filters (e.g., for increasing signal to noise ratio). The imaging device 110 is configured to detect light emitted or reflected from the locators 170 in a field of view of the imaging device 110. In embodiments where the locators 170 include passive elements (e.g., a retroreflector), the imaging device 110 may include a light source that illuminates some or all of the locators 170, which retro-reflect the light towards the light source in the imaging device 110. Slow calibration data is communicated from the imaging device 110 to the console 120, and the imaging device 110 receives one or more calibration parameters from the console 120 to adjust one or more imaging parameters (e.g., focal length, focus, frame rate, ISO, sensor temperature, shutter speed, aperture, etc.).

The I/O interface 115 is a device that allows a user to send action requests to the console 120. An action request is a request to perform a particular action. For example, an action request may be to start or end an application or to perform a particular action within the application. The I/O interface 115 may include one or more input devices. Example input devices include a keyboard, a mouse, a hand-held controller, a glove controller, or any other suitable device for receiving action requests and communicating the received action requests to the console 120. An action request received by the I/O interface 115 is communicated to the console 120, which performs an action corresponding to the action request. In some embodiments, the I/O interface 115 may provide haptic feedback to the user in accordance with instructions received from the console 120. For example, haptic feedback is provided by the I/O interface 115 when an action request is received, or the console 120 communicates instructions to the I/O interface 115 causing the I/O interface 115 to generate haptic feedback when the console 120 performs an action.

The console 120 provides content to the HMD 105 for presentation to the user in accordance with information received from the imaging device 110, the HMD 105, or the I/O interface 115. The console 120 includes an application store 150, a tracking module 140, and the engine 145. Some embodiments of the console 120 have different or additional modules than those described in conjunction with FIG. 1. Similarly, the functions further described below may be distributed among components of the console 120 in a different manner than is described here.

The application store 150 stores one or more applications for execution by the console 120. An application is a group of instructions, that when executed by a processor, generates content for presentation to the user. Content generated by an application may be in response to inputs received from the user via movement of the HMD 105 or the I/O interface 115. Examples of applications include gaming applications, conferencing applications, video playback application, or other suitable applications.

The tracking module 140 calibrates the system 100 using one or more calibration parameters and may adjust one or more calibration parameters to reduce error in determining position of the HMD 105. For example, the tracking module 140 adjusts the focus of the imaging device 110 to obtain a more accurate position for observed locators 170 on the HMD 105. Moreover, calibration performed by the tracking module 140 also accounts for information received from the IMU 175. Additionally, if tracking of the HMD 105 is lost (e.g., imaging device 110 loses line of sight of at least a threshold number of locators 170), the tracking module 140 re-calibrates some or all of the system 100 components.

Additionally, the tracking module 140 tracks the movement of the HMD 105 using slow calibration information from the imaging device 110 and determines positions of a reference point on the HMD 105 using observed locators from the slow calibration information and a model of the HMD 105. The tracking module 140 also determines positions of the reference point on the HMD 105 using position information from the fast calibration information from the IMU 175 on the HMD 105. Additionally, the tracking module 160 may use portions of the fast calibration information, the slow calibration information, or some combination thereof, to predict a future location of the HMD 105, which is provided to the engine 145.

The engine 145 executes applications within the system 100 and receives position information, acceleration information, velocity information, predicted future positions, or some combination thereof for the HMD 105 from the tracking module 140. Based on the received information, the engine 145 determines content to provide to the HMD 105 for presentation to the user, such as a virtual scene, one or more virtual objects to overlay onto a real world scene, etc.

In some embodiments, the engine 145 maintains focal capability information of the optics block 165. Focal capability information is information that describes what focal distances are available to the optics block 165. Focal capability information may include, e.g., a range of focus the optics block 165 is able to accommodate (e.g., 0 to 4 diopters), a resolution of focus (e.g., 0.25 diopters), a number of focal planes, combinations of settings for switchable half wave plates (SHWPs) (e.g., active or non-active) that map to particular focal planes, combinations of settings for SHWPS and active liquid crystal lenses that map to particular focal planes, or some combination thereof.

The engine 145 generates instructions for the optics block 165, the instructions causing the optics block 165 to adjust its focal distance to a particular location. The engine 145 generates the instructions based on focal capability information and, e.g., information from the vergence processing module 190, the IMU 175, and the head tracking sensors 180. The engine 145 uses the information from the vergence processing module 190, the IMU 175, and the head tracking sensors 180, or some combination thereof, to select an ideal focal plane to present content to the user. The engine 145 then uses the focal capability information to select a focal plane that is closest to the ideal focal plane. The engine 145 uses the focal information to determine settings for one or more SHWPs, one or more active liquid crystal lenses, or some combination thereof, within the optics block 176 that are associated with the selected focal plane. The engine 145 generates instructions based on the determined settings, and provides the instructions to the optics block 165.

The engine 145 performs an action within an application executing on the console 120 in response to an action request received from the I/O interface 115 and provides feedback to the user that the action was performed. The provided feedback may be visual or audible feedback via the HMD 105 or haptic feedback via the I/O interface 115.

Figure 2:
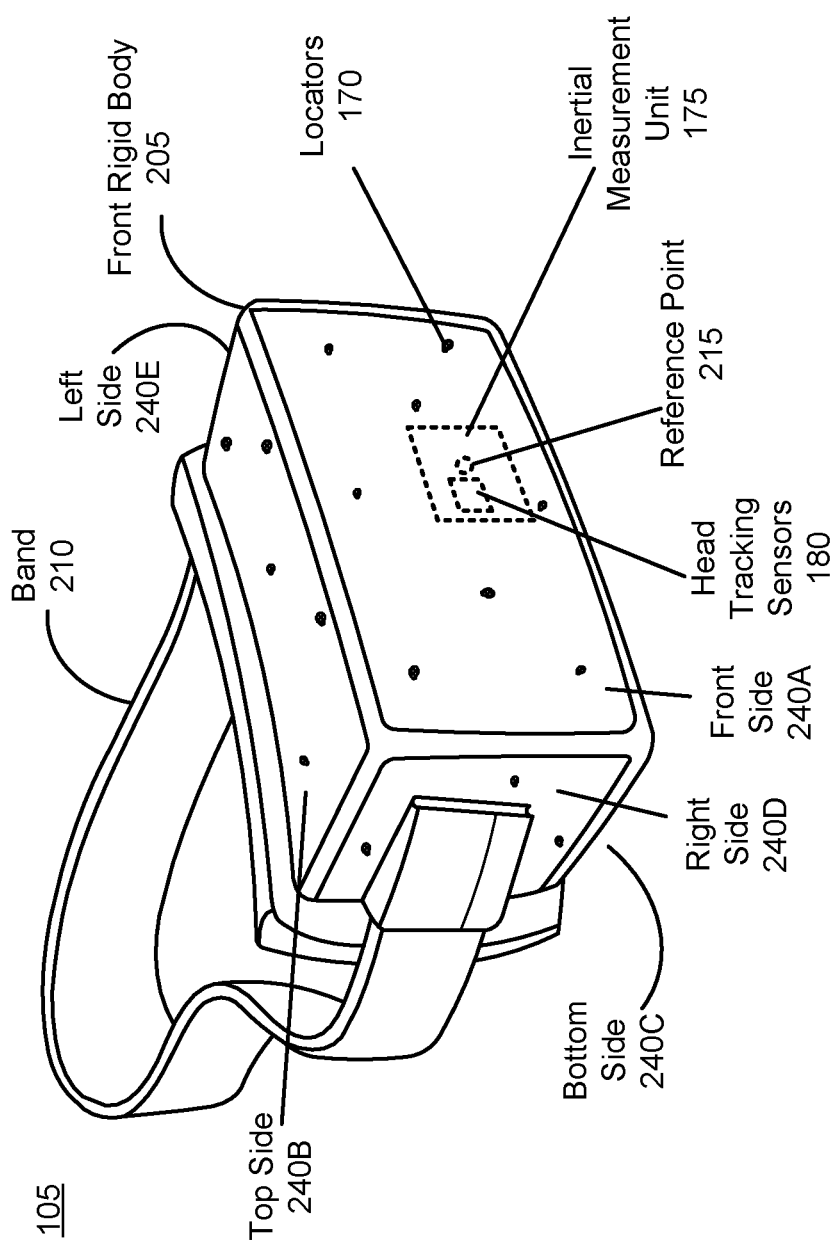
FIG. 2 is a perspective view of the HMD of FIG. 1, in accordance with one embodiment.

FIG. 2 shows a head-mounted display (HMD) 105, in accordance with some embodiments. The HMD 105 includes a front rigid body 205 and a band 210. The front rigid body 205 includes an electronic display (not shown), an inertial measurement unit (IMU) 175, one or more head tracking sensors (or "position") sensors 180, and locators 170. In some embodiments, a user movement is detected by use of the inertial measurement unit 175, head tracking sensors 180, and/or the locators 170, and an image is presented to a user through the electronic display according to the user movement detected. In some embodiments, the HMD 105 can be used for presenting a virtual reality, an augmented reality, or a mixed reality to a user.

A head tracking sensor 180 generates one or more measurement signals in response to motion of the HMD 105. Examples of head tracking sensors 180 include: one or more accelerometers, one or more gyroscopes, one or more magnetometers, another suitable type of sensor that detects motion, a type of sensor used for error correction of the IMU 175, or some combination thereof. The head tracking sensors 180 may be located external to the IMU 175, internal to the IMU 175, or some combination thereof. In FIG. 2, the head tracking sensors 180 are located within the IMU 175, and neither the IMU 175 nor the head tracking sensors 180 are visible to the user.

Based on the one or more measurement signals from one or more head tracking sensors 180, the IMU 175 generates calibration data indicating an estimated position of the HMD 105 relative to an initial position of the HMD 105. In some embodiments, the IMU 175 rapidly samples the measurement signals and calculates the estimated position of the HMD 105 from the sampled data. For example, the IMU 175 integrates the measurement signals received from the accelerometers over time to estimate a velocity vector and integrates the velocity vector over time to determine an estimated position of a reference point on the HMD 105. Alternatively, the IMU 17 provides the sampled measurement signals to a console (e.g., a computer), which determines the calibration data. The reference point is a point that may be used to describe the position of the HMD 105. While the reference point may generally be defined as a point in space; however, in practice the reference point is defined as a point within the HMD 105 (e.g., a center of the IMU 175).

The locators 170 are located in fixed positions on the front rigid body 205 relative to one another and relative to a reference point 215. In FIG. 2, the reference point 215 is located at the center of the IMU 175. Each of the locators 170 emits light that is detectable by an imaging device (e.g., camera or an image sensor). Locators 170, or portions of locators 170, are located on a front side 240A, a top side 240B, a bottom side 240C, a right side 240D, and a left side 240E of the front rigid body 205 in the example of FIG. 2.

Figure 3:
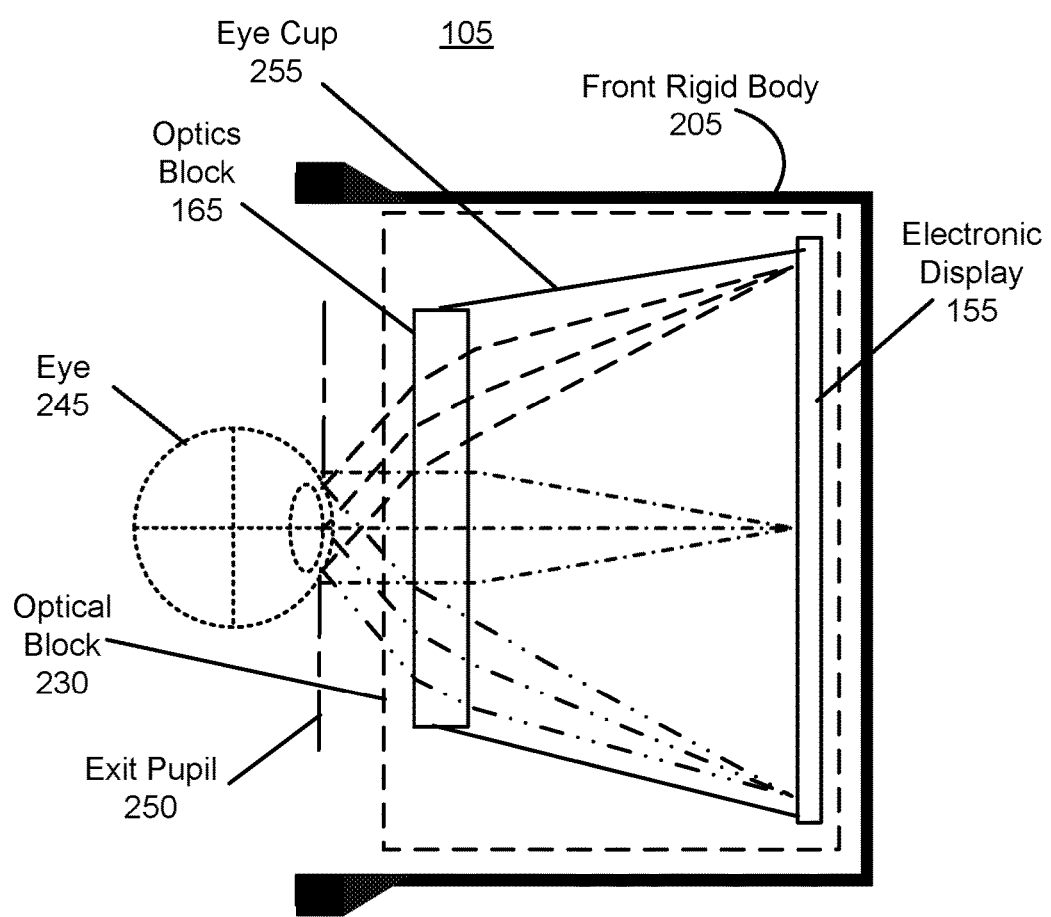
FIG. 3 is a cross sectional diagram illustrating a front rigid body of the HMD in FIG. 2, in accordance with one embodiment.

FIG. 3 shows a cross section of the front rigid body 205 of the HMD 105 shown in FIG. 2. The front rigid body 205 includes the electronic display 155 and an optical block 230. The optical block 230 provides altered image light from the electronic display 155 to an exit pupil 250. The exit pupil 250 is the location in the front rigid body 205 where a user's eye 245 is positioned. Although a single optical block 230 is shown in FIG. 3, the front rigid body 205 may include two optics blocks, one for each eye of the user.

The optical block 230 includes an optics block 165 and an eye cup 255. The eye cup 255 is mechanically secured with the front rigid body 205, and holds the optics block 165. The electronic display 155 emits image light toward the optics block 165. The optics block 165 magnifies the image light, and in some embodiments, also corrects for one or more additional optical errors (e.g., distortion, astigmatism, etc.). The optics block 165 directs the image light to the exit pupil 250 for presentation to the user. In some embodiments, the optics block 165 and the eye cup 255 may be omitted from the optical block 230.

The electronic display 155 emits image light for the optical block 230. As discussed in greater detail below, various regions of the electronic display 155 can be selectively controlled to display a variable resolution frame. Pixels of the electronic display 155 corresponding with a focus area of the eye 245 may operate at a native resolution where pixels are programmed (e.g., in a raster fashion for a frame) individually, while pixels outside of the focus area of the eye 245 may operate with a reduced resolution where multiple pixels are programmed as a group with a common pixel value.

Figure 4:
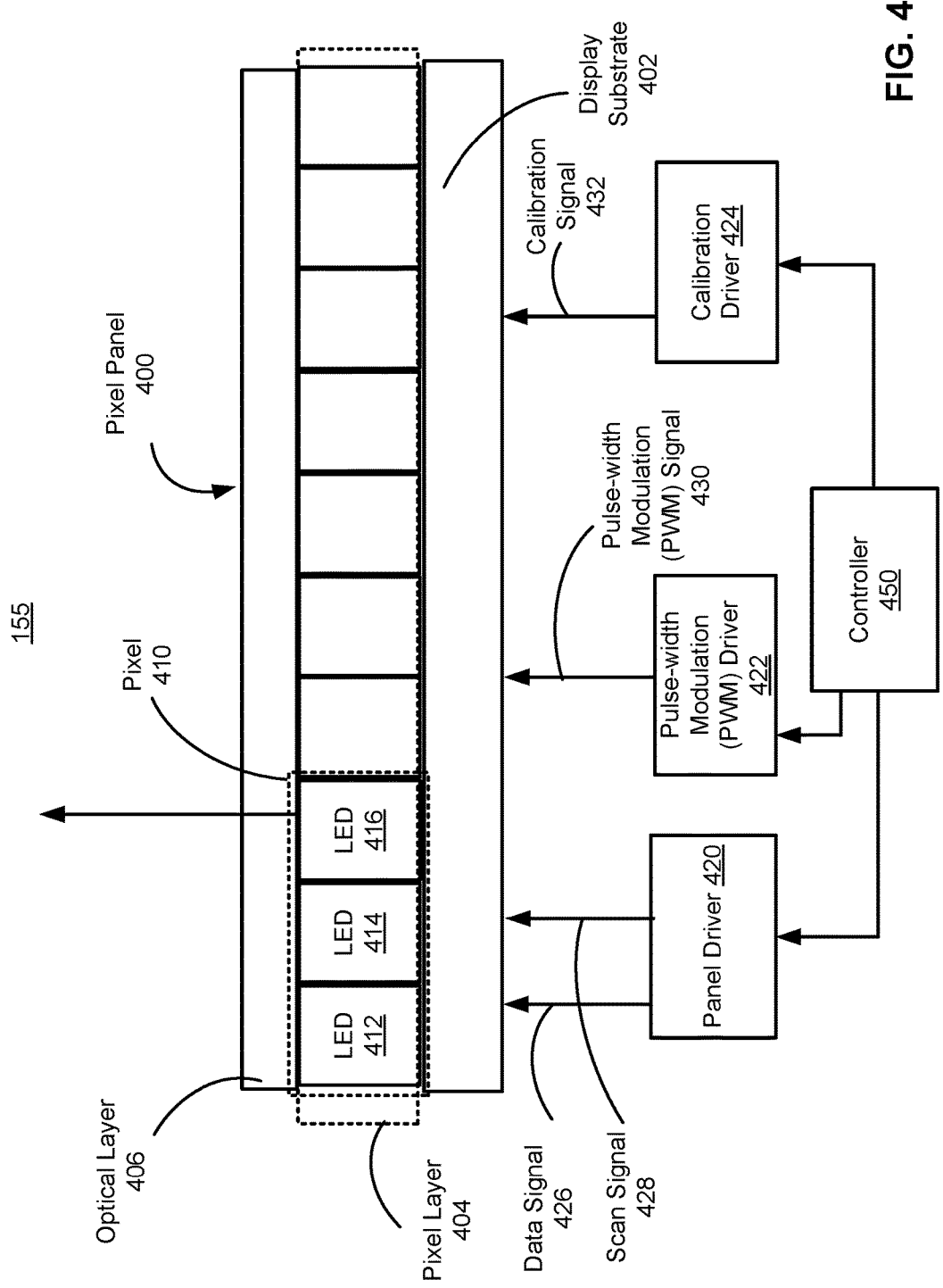
FIG. 4 is a block diagram illustrating an electronic display, in accordance with one embodiment.

FIG. 4 is a block diagram illustrating the electronic display 155 in the HMD 105, in accordance with one embodiment. The electronic display 155 has a display panel 400 including a display substrate 402 (or "substrate 402"), a pixel layer 404, and an optical layer 406. The pixel layer 404 includes an array of pixels 410 that are positioned on the display substrate 402. The pixels 410 of the pixel layer 404 emit light to provide image frames to the viewer. The display substrate 402 provides structural support for the pixels 410. The display substrate 402 further provides electrical connections via trace lines between the sub-pixel of the pixels 410 and a panel driver 420, a pulse-width modulation (PWM) driver 422, and a calibration driver 424. The display substrate 402 may be flexible substrate such as polymer or a rigid substrate such as a Thin Film Transistor (TFT) glass substrate, and includes the active matrix architecture. As discussed in greater detail in connection with FIGS. 5 and 6, the panel driver 420 provides a data signal 426 to data lines of the electronic display 155 and a scan signal 428 to the scan lines of the display panel 400. The PWM driver 422 provides a PWM signal 430 to provide pulse width modulation to the driving current of the LEDs. In some embodiments, the calibration driver 424 provides a calibration signal 432 for adjusting gate voltage applied to each transistor of each LED. In some embodiments, the calibration driver 424 and corresponding features for providing the calibration in the substrate 402 are omitted.

The pixel layer 404 includes the sub-pixels that form the pixels 410. For example, a pixel 410 may include sub-pixels formed from LEDs 412, 414, and 416 respectively providing red, green, and blue color sub-pixels. Multiple sets of LEDs 412, 414, and 416 are positioned on the display substrate 402 adjacent to each other to form a matrix of pixels 410. Each LED of each pixel 510 may emit different color light.

In some embodiments, the LEDs of each pixel 410 are each formed from a "µLED," or "Micro-LED," which is a particular type of LED having a small active light emitting area (e.g., less than 2,000 µm$^2$). A micro-LED may further include structures that produce collimated light output, such as a mesa structure with a reflective layer that reflects light emitted from an active region within the mesa structure to a light emitting surface on a side opposite the mesa structure. The LEDs of the pixel layer 404 may be fabricated separately and then bonded to the display substrate 402. For example, micro-LEDs may be fabricated on a native substrate, singulated, and then transferred to the display substrate 402 to form the pixel layer 404. The micro-LEDs may be positioned on the surface of the display substrate 402, and then bonded to form electrical connections with the lines of the display substrate 402 (e.g., including a TFT layer). In other embodiments, the electronic display 155 may be some other types of electronic display, including those with other types of structures such as organic light emitting diode (OLED), liquid crystal display (LCD), or inorganic light emitting diode (ILED).

The optical layer 406 may be disposed on top of the pixel layer 404. The optical layer 406 may include one or more optical elements that transmit the light emitted from the pixels 410. The optical layer 406 may include brightness enhancement films (BEFs), diffusers, polarizers, etc. The optical layer 406 can change characteristics of the light passed through the optical layer 406, such as polarization orientation, efficiency of light extraction from the display panel, etc. The optical layer 406 may also provide structural protection for the components of the pixel layer 404. In some embodiments, the optical layer 406 is omitted from the electronic display 155.

A controller 450 may be coupled to each of the panel driver 420, PWM driver 422, and calibration driver 424. As discussed in greater detail below in connection with FIG. 11, the controller 450 may be configured to optimize digital words used by the panel driver 420 and pulses used by the PWM driver 422 to reduce dynamic power consumption in the electronic display 155. In some embodiments, the functionality of the controller 450 is integrated with one or more of the panel driver 420, PWM driver 422, or calibration driver 424. In some embodiments, the controller 450 is located in the HMD 105 (e.g., scene rendering module 185) or console 120 (e.g., engine 145). In some embodiments, a data bit-stream including the digital word is sent to the panel driver 420 from the controller 450 (e.g., including a graphics pipeline), where digital word is stored in a frame buffer of the panel driver. To reduce the number of transitions from low to high, the high bit values (e.g., 1) may be stored sequentially, followed by the low bit values (e.g., 0). Therefore, the data signal of the panel driver 420 may stay "high" at the beginning and then make one transition to low. In another embodiment, the controller 450 coordinates the transmission of the digital word to the panel driver 420, such as by providing scan signals to the panel driver 420.

Figure 5:
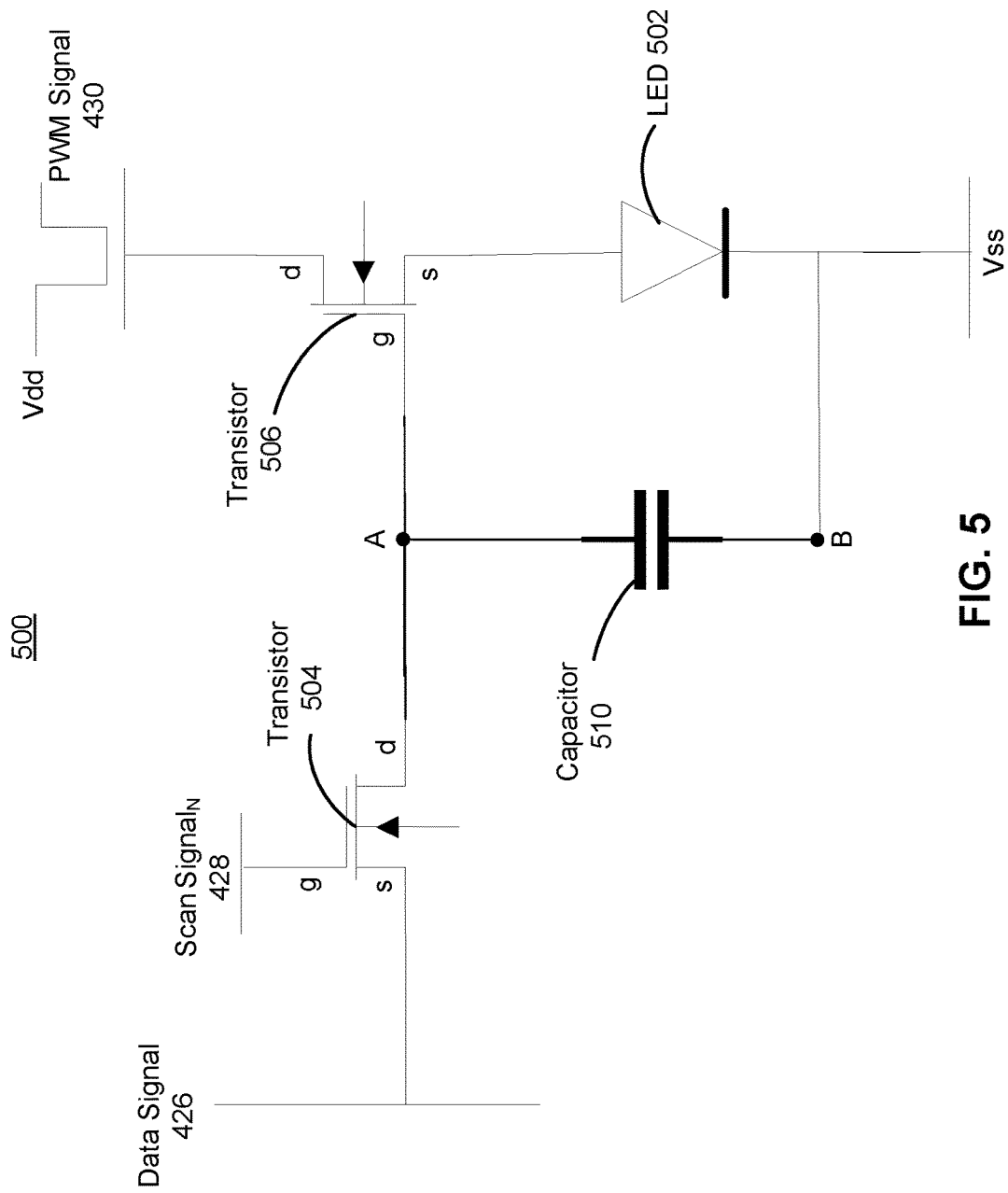
FIG. 5 is a schematic diagram of a control circuit for a sub-pixel of an electronic display, in accordance with one embodiment.

FIG. 5 is a schematic diagram of a control circuit 500 for a sub-pixel of an electronic display 155, in accordance with one embodiment. The electronic display 155 may include a control circuit 500 for each sub-pixel of the display panel 400 to control the LED 502 of the sub-pixel. The control circuit 500 may include, among other components, a transistor 504, a transistor 506, a capacitor 512, and the LED 502.

The transistor 506 is a driving transistor for the LED 502. A first terminal of the LED 502 is connected to Vss (e.g., ground or other low reference voltage) and a second terminal of the LED 502 is connected to the source of the transistor 506. The drain of the transistor 506 is connected to the PWM driver 420 to receive the PWM signal 430. The gate of the transistor 506 is connected at a node A with a first terminal of the capacitor 510 and the drain of the transistor 504. The source of the transistor 504 is connected to the panel driver 420 to receive the data signal 426, and the gate of the transistor 504 is connected to the panel driver 420 to receive scan signal$_N$ 428. The scan signal$_N$ refers to the scan signal for an Nth row that includes the sub-pixel of the control circuit 500 shown in FIG. 5. The first terminal of the LED 502 is further connected to node B with the second terminal of the capacitor 510 and Vss.

The transistors of the control circuit 500, as well as the other control circuits discussed herein, may include thin-film transistors (TFTs). In another example, the transistors may be implemented with silicon processes. The transistors may include n-type transistors, p-type transistors, or combinations of n-type and p-type transistors.

Figure 6:
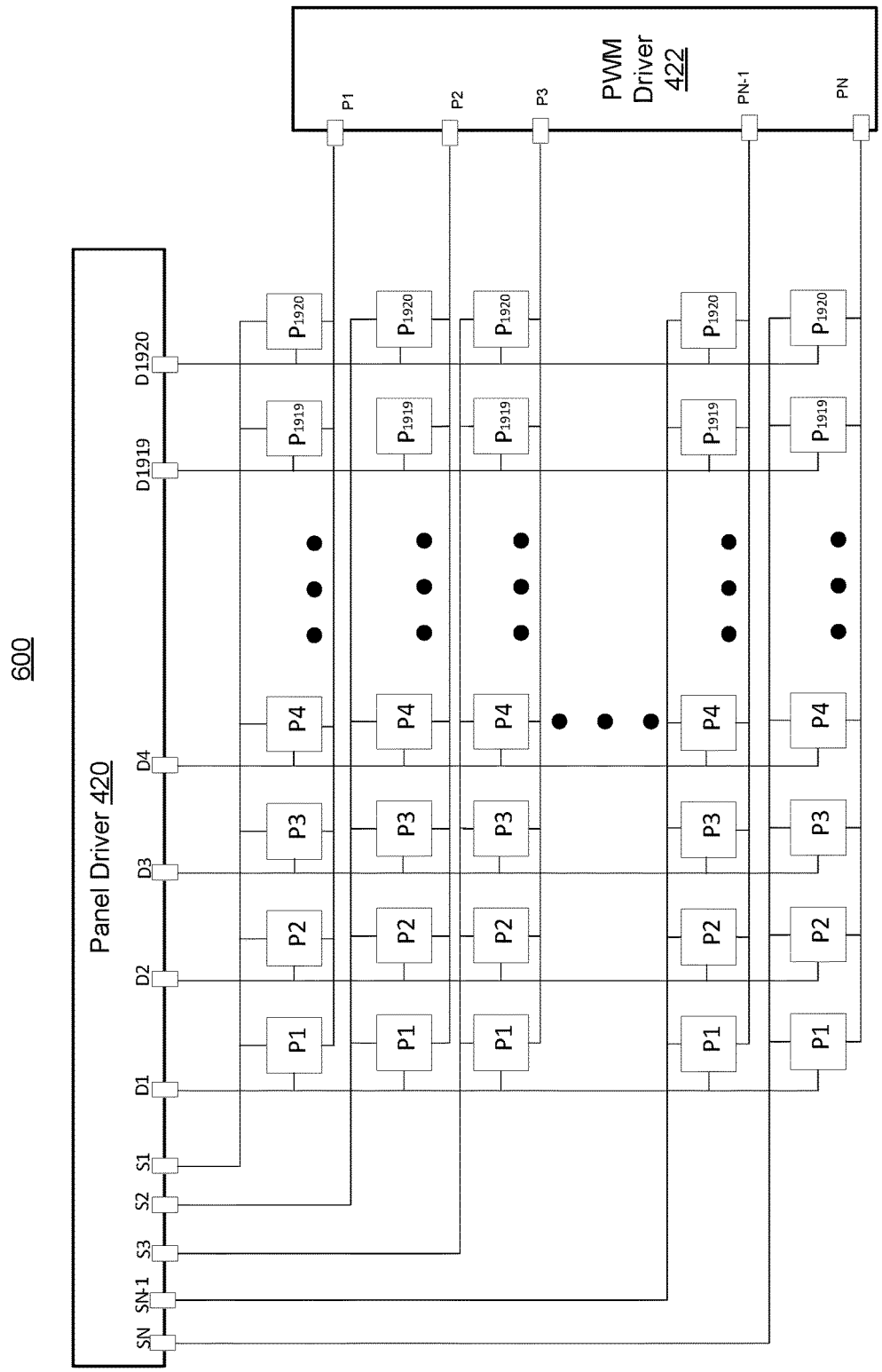
FIG. 6 is a block diagram of a control system for the electronic display including control circuits as shown in FIG. 5, in accordance with one embodiment.

FIG. 6 is a block diagram of a control system 600 for the electronic display 155 including control circuits 500, in accordance with one embodiment. The electronic display 155 includes an array of pixels, such as 1920 columns×N rows of pixels. Here, N is used as a row index as well as an index for scan signals that are provided to each of the rows. The pixel resolution, such as the column size, of the electronic display may vary. For example, rather than having 1920 columns of pixels, the electronic display may include M columns where M is an integer value.

Each pixel includes multiple sub-pixels, such as a red color sub-pixel including a red color LED, a blue color sub-pixel including a blue color LED, and a green color sub-pixel including a green color LED. Each of the sub-pixel types may be controlled by a control system 600. For example, the control system 600 includes 1920 columns of sub-pixels×N rows of sub-pixels. The rows of sub-pixels are controlled by the scan lines S1 through SN connected to the panel driver 420. Each row of pixels includes pixels P1 through P1920. The panel driver 420 provides the scan signals 428 to the rows of sub-pixels via the scan lines S1 through SN. The panel driver 420 provides the data signals 426 to columns of sub-pixels via the data lines D1 through D1920. The PWM driver 422 provides the PWM signals 430 to rows of sub-pixels via the PWM lines P1 through PN.

Figure 7:
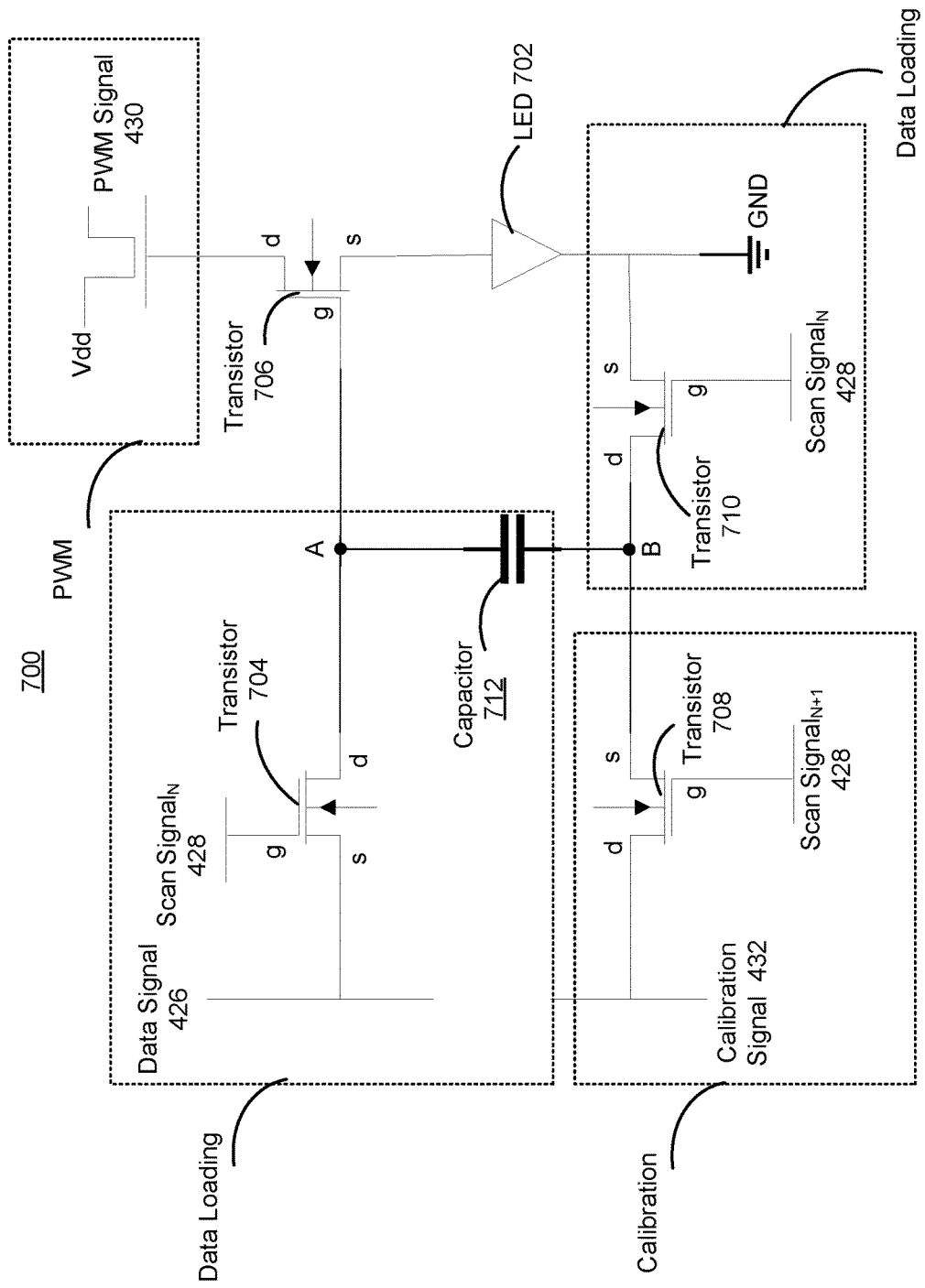
FIG. 7 is a schematic diagram of a control circuit for a sub-pixel of an electronic display, in accordance with one embodiment.

FIG. 7 is a schematic diagram of a control circuit 700 for a sub-pixel of an electronic display 155, in accordance with one embodiment. The electronic display 155 may include a control circuit 700 for each sub-pixel of the display panel 400 to control the LED 702 of the sub-pixel. The control circuit 700 is similar to the control circuit 500, but further provides for calibration functionality. The control circuit 700 includes a transistor 704, a transistor 706, a transistor 708, and transistor 710, a capacitor 712, and the LED 702.

The transistor 706 is a driving transistor for the LED 702. A first terminal of the LED 702 is connected to a low reference voltage (e.g., ground) and a second terminal of the LED 702 is connected to the source of the transistor 706. The drain of the transistor 706 is connected to the PWM driver 420 to receive the PWM signal 430. The gate of the transistor 706 is connected at a node A with a first terminal of the capacitor 712 and the drain of the transistor 704. The source of the transistor 704 is connected to the panel driver 420 to receive the data signal 426, and the gate of the transistor 704 is connected to the panel driver 420 to receive the scan signal$_N$ 428. The scan signal$_N$ refers to the scan signal for an Nth row that includes the sub-pixel of the control circuit 700 shown in FIG. 7.

The first terminal of the LED 702 is further connected to the source of the transistor 710. The gate of the transistor 710 is connected to the panel driver 420 to receive the scan signal$_N$ 428. The drain of the transistor 710 is connected to a node B with a second terminal of the capacitor 712 and the source of the transistor 708. The gate of the transistor 708 is connected to the panel driver 420 to receive scan signal$_{N+1}$ 428. The scan signal$_{N+1}$ refers to the scan signal of a row of pixels (N+1 row) adjacent to the Nth row of pixels receiving the scan signal$_N$. The drain of the transistor 708 is connected to the calibration signal 432.

The transistor 704, capacitor 712, transistor 710, data signal 426, and scan signal$_N$ 428 are used in providing data loading to the LED 702. The PWM signal 430 is used in providing a pulse-width modulated signal for the transistor 706 to drive the LED 702. The calibration signal 432, scan signal$_{N+1}$ 428, and transistor 708 are used in providing calibration to adjust the gate voltage applied to the transistor 706. In some embodiments, the calibration driver 424 is a memory storing a calibration value (or "Vcal") for each control circuit 700. The Vcal for different LEDs 702 or sub-pixel of the electronic display 155 can be different, and may be determined in a post-manufacturing calibration and stored in the calibration driver 424, or a separate memory accessible to the calibration driver 424.

Figure 8:
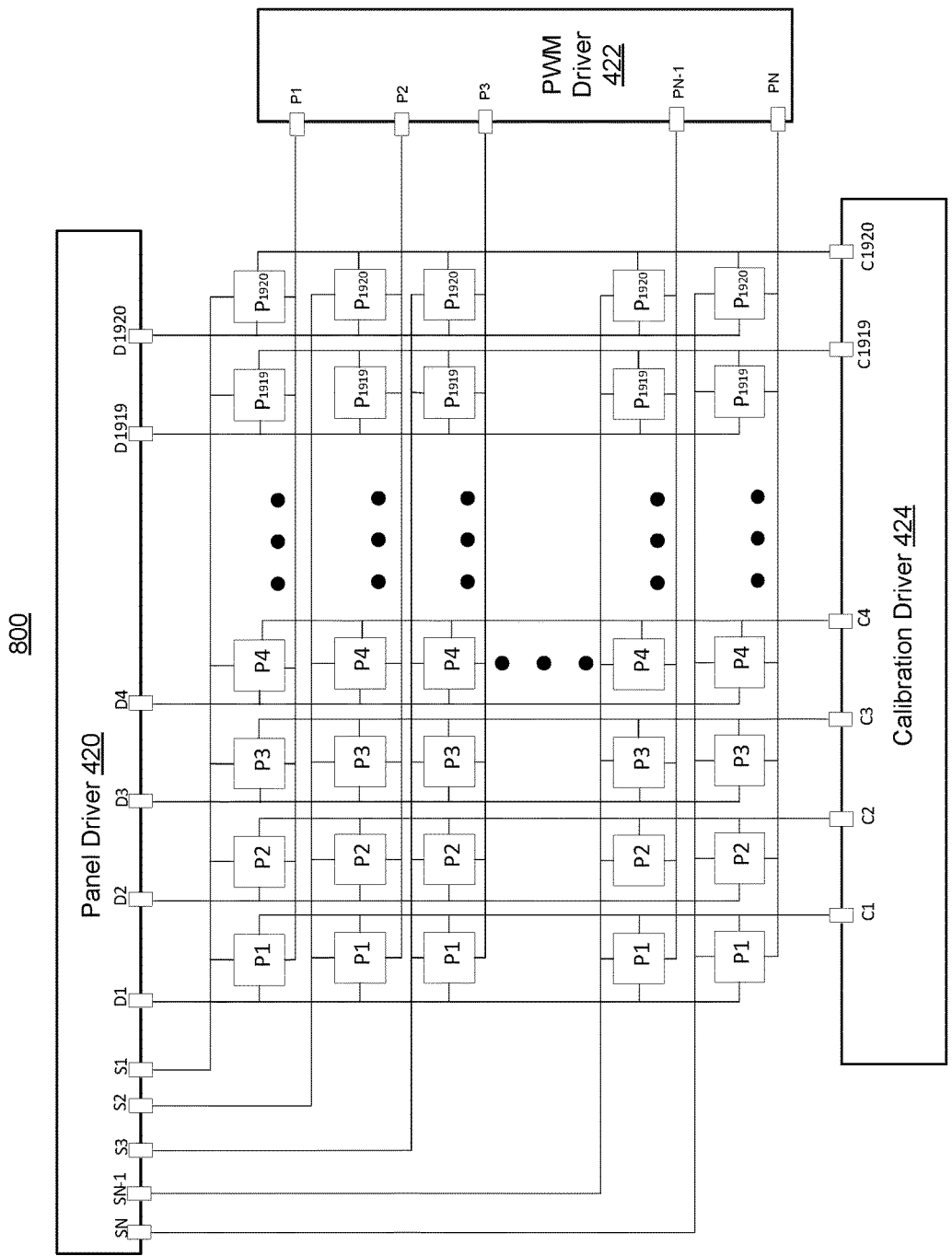
FIG. 8 is a block diagram of a control system for the electronic display including control circuits as shown in FIG. 5, in accordance with one embodiment.

FIG. 8 is a block diagram of a control system 800 for the electronic display 155, in accordance with one embodiment. The discussion of the control system 600 and FIG. 6 may be applicable to the control system 800. The control system 800 further includes the calibration driver 424 that provides the calibration signal 432 to columns of the sub-pixels via the calibration lines C1 through C1920. Although not shown in FIG. 8, the panel driver 420 further provides the scan signal$_{N+1}$ 428 to each scan line N as discussed above in connection with FIG. 7.

Some embodiments of the electronic display 155 use the PWM driver 422 to implement a PWM driving scheme. Here, the brightness (as defined by a grayscale value) of the sub-pixel is determined by the time that the light sources (e.g., μLED or OLED) emit light. For each frame or "pixel time," the PWM signal 430 may include n pulses having different durations. The brightness of the sub-pixel is controlled by a digital word having n bits, where each of the n bits is associated with one of the n pulses and defines whether the LED emits light during each of the n pulses.

Figure 9:
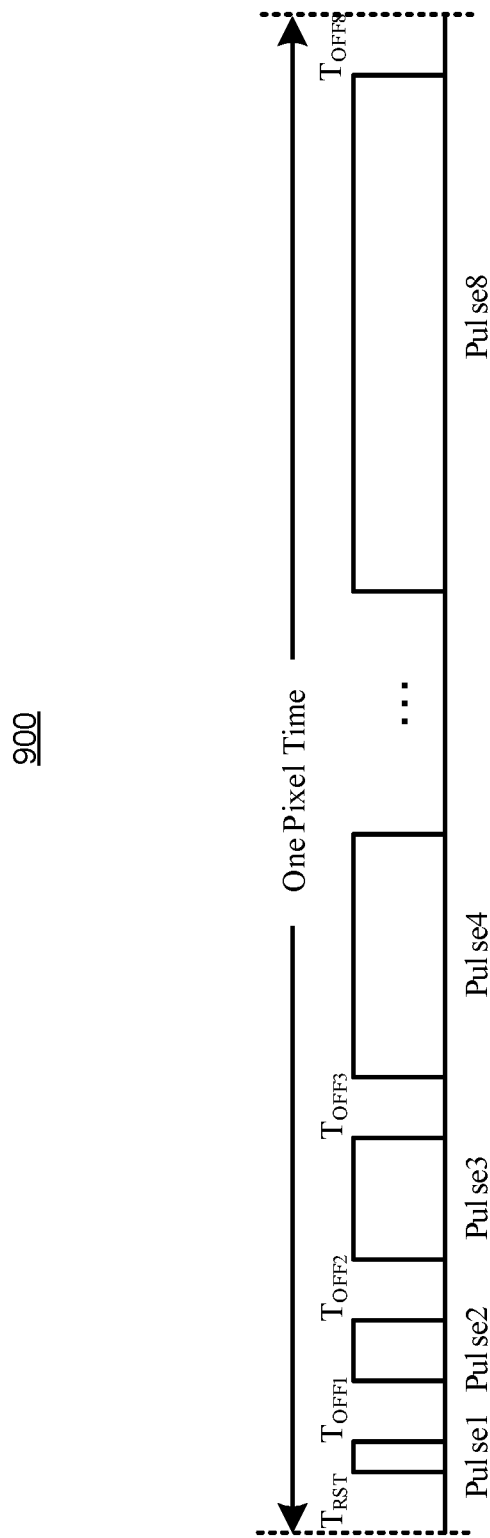
FIG. 9 is a timing diagram of a series of pulses in a pixel time of a PWM signal, in accordance with one embodiment.

FIG. 9 is a timing diagram of a series of pulses during a pixel time 900 of the PWM signal 430, in accordance with one embodiment. The timing diagram represents one pixel time or row time in which an n=8 bit digital word from the data signal 426 is programmed into a capacitor of a control circuit (e.g., the capacitor 510 for the control circuit 500 or the capacitor 710 for the control circuit 700) in connection with the pulses of the PWM signal 430 being provided to the control circuit to control the brightness of light emission from the LED of the sub-pixel. Each pixel time 900 includes n=8 pulses, as shown by pulse1 through pulse8, where the numbering of the pulse denotes the sequence of the pulses. The pulse1 through pulse8 each have different durations. For example, pulse1 has the shortest duration, pulse2 has the next shortest duration, and so forth with pulse8 having the longest duration.

The n bit digital word is unmodified and defines a grayscale value for the sub-pixel within the pixel time 900. Each bit of the digital word is associated with a particular pulse$_n$. As such, each bit of the digital word is loaded into the sub-pixel, in particular the capacitor of the control circuit, during each T$_{OFF}$ within the pixel time 900. In the example where n=8 bits for the unmodified digital word, an unmodified sequence of pulses is used where most significant bit (MSB) of the digital word is associated with the longest duration pulse8, the next most significant bit is associated with pulse7, and so forth with the least significant bit (LSB) being associated with the shortest duration pulse1. If a bit has a value of 1, then the sub-pixel is ON (emitting light) during the pulse associated with the bit. Alternatively, if the bit has a value of 0, then the sub-pixel is OFF during the pulse associated with the bit.

In some embodiments, the duration of pulse1 through pulse8 is related in the unmodified sequence of pulses in that each successive pulse has a duration twice as long as the duration of the previous pulse. The duration T$_n$ for each pulse$_n$ can be defined by Equation 1:

$$T_n = 2^{n-1} * T_{LDB} \qquad (1)$$

where T$_{LSB}$ is the duration of the shortest pulse1 associated with the least significant bit of the digital word, and n is a pulse series index value. Applying the Equation 1 to the pixel time 900, the pulse1 has a duration T$_{LSB}$, the pulse2 has a duration 2T$_{LSB}$, the pulse3 has a duration 4T$_{LSB}$, the pulse4 has a duration 8T$_{LSB}$, and so forth with the pulse8 having a duration 128T$_{LSB}$.

For example, the 8 bit digital word 10101010 (defining grayscale value=170) results in the sub-pixel being on for pulse8, off for pulse7, on for pulse6, off for pulse5, on for pulse4, off for pulse3, on for pulse2, and off for pulse 1. In another example, the 8 bit digital word 11001100 (defining grayscale value=204) results in the sub-pixel being on for pulse8 and pulse7, off for pulse6 and pulse5, on for pulse4 and pulse3, and off for pulse2 and pulse1. In another example, the 8 bit digital word 11110000 (defining grayscale value=240) results in the sub-pixel being on for pulse1, pulse2, pulse3, and pulse4, and the sub-pixel being off for pulse5, pulse6, pulse7, and pulse8.

The dynamic power consumption P$_{dyn}$ of the sub-pixel is defined by Equation 2:

$$P_{dyn} = C_{tot} * V_{data}^2 * f \qquad (2)$$

where $C_{tot}$ is the storage capacitance of the capacitor in a control circuit and the gate capacitance of the driving transistor in the control circuit (e.g., the transistor 506 for the control circuit 500 or the transistor 706 for the control circuit 700), Vdata is the data voltage and f is the frequency.

Equation 2 indicates that dynamic power consumption is related to charging and discharging of the capacitor in the control circuit of the sub-pixel. When the capacitor is charged, then power is consumed because carriers move to the capacitor. When capacitor is discharged, the dynamic power is zero since all carriers propagate to ground.

The panel driver 420 provides the digital word from the LSB to the MSB in accordance with the PWM signal for the pixel time 900. For the digital word 10101010, there are four transitions from 0 to 1 defined from the LSB to the MSB. For the digital word 11001100, there are two transitions from 0 to 1 defined from the LSB to the MSB. For the digital word 11110000, there is one transition from 0 to 1 defined from the LSB to the MSB. As such, the digital word 10101010 has the highest dynamic power consumption, followed by the digital word 11001100, and then the digital word 11110000. For the digital word 11111111 (defining grayscale value=256) and the digital word 00000000 (defining grayscale value=0), there are no transitions from 0 to 1 and thus the dynamic power consumption is zero or some other low amount of power consumption.

Under the PWM driving scheme, the brightness of the sub-pixel during a pixel time is determined by the time that the light sources emit light within the period of the pixel time. As such, the bit sequence of a digital word can be changed to generate a modified digital word with fewer or no transitions from a lower voltage level (e.g., representing a bit value of 0) to a higher voltage level (e.g., representing a bit value of 1) defined from the LSB to the MSB without changing the brightness of light emitted from the sub-pixel if the sequence of pulses of different durations is also changed accordingly.

Figure 10:
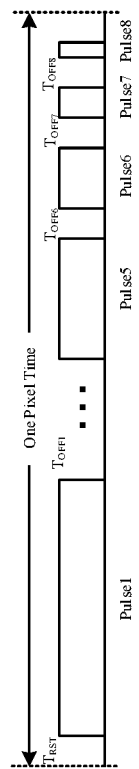
FIG. 10 is a timing diagram of a modified series of pulses in a pixel time of a PWM signal, in accordance with one embodiment.

FIG. 10 is a timing diagram of a modified series of pulses in a pixel time 1000 of the PWM signal 430, in accordance with one embodiment. The pixel time 1000 differs from the pixel time 900 shown in FIG. 9 because sequence of pulses in the pixel time 900 has been changed, such as based on a modified digital word. In the pixel time 1000, pulse1 in the sequence has the longest duration (e.g., $128T_{LSB}$), the second pulse2 has the second longest duration (e.g., $64\ T_{LSB}$), and so forth with the pulse8 having the shortest duration (e.g., $T_{LSB}$). If the sequence of bit values of the digital word for the pixel time 900 is b8, b7, b6, b5, b4, b3, b2, and b1 for pulse1 to pulse 8, then the modified digital word for the pixel time 1000 has a sequence of bit values b1, b2, b3, b4, b5, b6, b7, and b8 for the modified sequence of pulse1 to pulse8. The bit values and their associations with particular durational pulses do not change in the conversion from the digital word to the modified digital word although the order of the bits can change.

For example, the digital word 10101010 for the pulse sequence of the pixel time 900 can be represented as 01010101 by the modified digital word for the pulse sequence of the pixel time 1000. In another example, the digital word 11001100 for the pulse sequence of the pixel time 900 can be represented as 00110011 by the modified digital word for the pulse sequence of the pixel time 1000. In both examples, the brightness of the sub-pixel is the same for both the digital word and the modified digital word because while the pulse durations are rearranged in time, the combined duration of the pulses1 through 8 is the same relative to the total pixel time. The pixel time 1000 is only one example of a modified series of pulses for the PWM signal 430 for a particular modification of the digital word that maintains brightness level of light emission in the sub-pixel. More generally, the order of bits in the unmodified (e.g., greyscale value) digital word can be rearranged in various ways for the modified digital word so long as each bit remains associated with the corresponding pulse of proper duration.

To reduce dynamic power consumption as defined by Equation 2, the sequence of bits of the unmodified digital word for a pixel time is changed to generate the modified digital word which reduces the transitions from the lower voltage level to the higher voltage level defined from the LSB to the MSB. The unmodified series pulses in the pixel time for the PW signal 430, each pulse having different duration, is changed accordingly into a modified series of pulses based on the sequence of bits of the modified digital word to preserve the combined duration of the pulses within the pixel time. The static power consumption remains unchanged, while the dynamic power consumption is decreased because fewer transitions from the lower voltage level to the higher voltage level defined from the LSB to the MSB in the modified digital word results in less discharging of the capacitor in the control circuit of the sub-pixel during the pixel time. In some embodiments, dynamic power consumption is reduced by minimizing the transition from the lower voltage level to the higher voltage level.

For example, the unmodified digital word 10101010 can be arranged into the modified digital word 0001111 to eliminate four transitions from 0 to 1 defined from the LSB to the MSB and the unmodified sequence of pulses of the PWM signal 430 can be arranged accordingly into a modified sequence to maintain total on duration for the sub-pixel during the pixel time. Here, the modified sequence of pulses in the pixel time defines pulse durations that are out of durational order of the unmodified sequence of pulses. More generally, the order of bit values b1 through bn of a n bit digital word can be changed to reduce dynamic power consumption and without changing static power consumption so long as the sequence of pulses in the PWM signal 430 is changed accordingly such that each of the bit values b1 through bn remains respectively associated with the pulse1 through pulse$_n$ as prior to the optimization.

Figure 11:
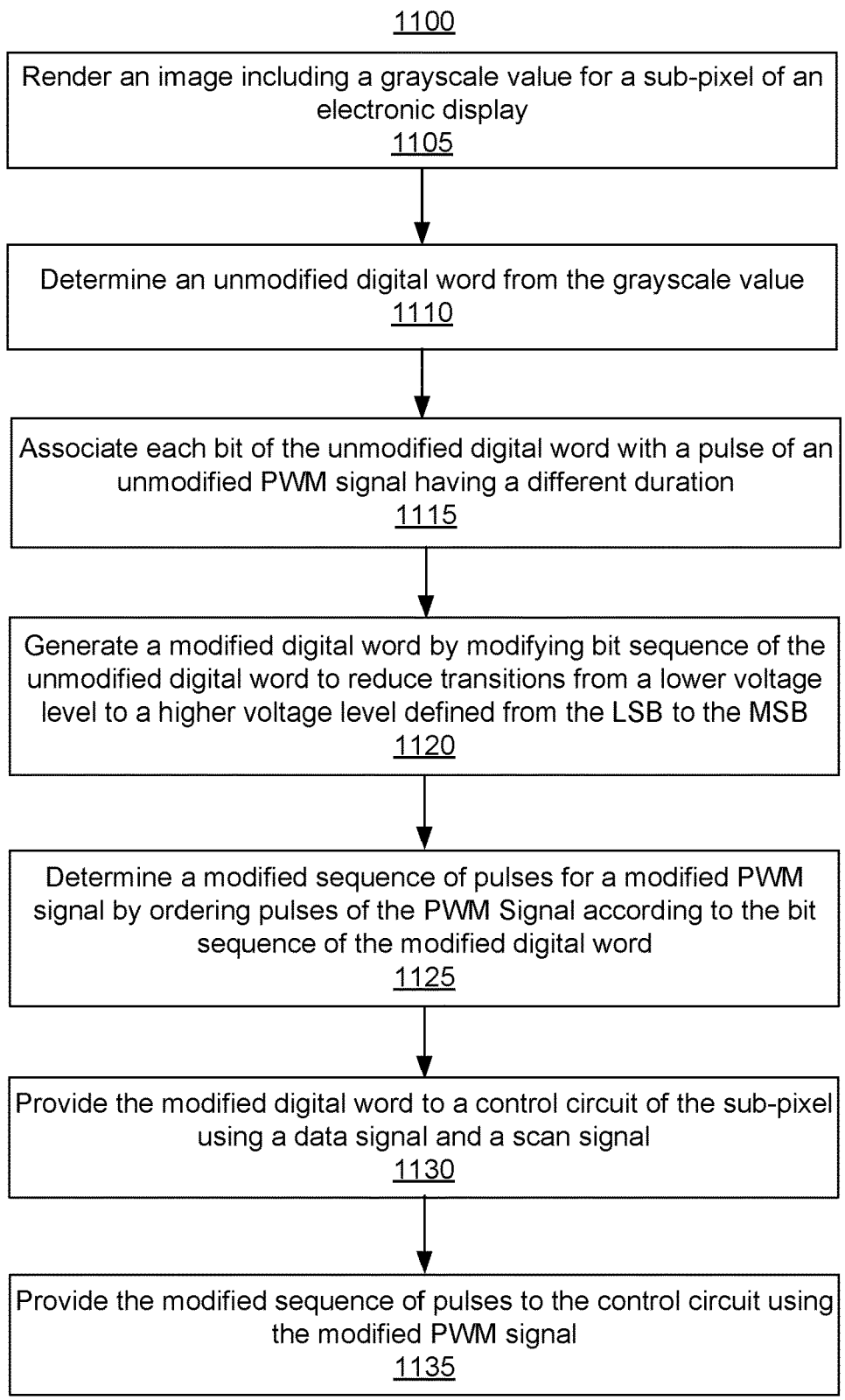
FIG. 11 is a flow chart of a process for reducing dynamic power consumption in an electronic display based on optimizing digital words and PWM signals, in accordance with one embodiment.

FIG. 11 is a flow chart of a process 1100 for reducing dynamic power consumption in an electronic display 155 based on optimizing digital words for PWM signals, in accordance with one embodiment. The process 1100 can be performed reduce dynamic power consumption caused by charging of a storage capacitor in a control circuit for a sub-pixel that is driven by a PWM signal having pulses with different durations. The process 1100 is discussed as being performed by the controller 450 of the HMD 105 in connection with the control circuit 500 shown in FIG. 5, but may also be performed with the control circuit 700 in FIG. 7 or other circuitry that controls a sub-pixel.

A controller 450 of the electronic display 155 or a graphical processor (e.g., scene rendering module 185) renders 1105 an image including a grayscale value for a sub-pixel of an electronic display 155. The sub-pixel may be part of a pixel of the electronic display 155, such as a sub-pixel dedicated to a particular color channel of the pixel. The image may include multiple pixels, each pixel including multiple sub-pixels. Each sub-pixel may emit light of a particular color. The image may include grayscale values for each sub-pixel of each pixel that controls the brightness of light emission from the LED 502 of the sub-pixel when displaying the image.

The controller 450 determines 1110 an unmodified digital word from the grayscale value. For example, the grayscale value may be used as the unmodified digital word. For If the grayscale value is represented in n bits corresponding with the n pulses of the PWM signal 430, then the grayscale value can be directly used as the unmodified digital word. In other examples, there may be no 0 to 1 transitions in the greyscale value, or the number of the 0 to 1 transitions in the greyscale value may sufficiently low such that modification of the digital word and PWM pulses is not triggered.

In other embodiments, the unmodified digital word is determined from similar grayscale values from multiple sub-pixels. For example, similar grayscale values from the sub-pixels may be combined to form bins of quantized grayscale values, and the digital word is determined as one of the quantized grayscale values that best fit the grayscale value of the sub-pixel. If the grayscale value includes more than n bits, then an n bit digital word can be used defining $2^n$ quantized grayscale values.

The controller 450 associates 1115 each bit of the unmodified digital word with a pulse of a PWM signal having a different duration. Each bit of the unmodified digital word may be associated with a pulse of a particular duration, where the pulses have durations related by a factor 2. For example, the MSB of the unmodified digital word is associated with the largest duration pulse1 of the unmodified PWM signal 430, the second MSB is associated with the second largest duration pulse2 of the unmodified PWM signal 430, and so forth with the LSB of the digital world being associated with the smallest duration pulse8 of the unmodified PWM signal 430.

The controller 450 generates 1120 a modified digital word by modifying bit sequence of the unmodified digital word to reduce transitions from a lower voltage level (e.g., representing bit value 0) to a higher voltage level (e.g., representing bit value 1) in the digital word from the LSB to the MSB. Reducing the 0 to 1 transitions reduces charging of the capacitor 510 and the dynamic power consumption within the pixel time. For example, the unmodified digital word 10101010 can be arranged into the modified digital word 00001111 to eliminate the four transitions from 0 to 1 defined from the LSB to the MSB. In another example the digital word 10101010 can be arranged into the modified digital word 11001100 to reduce the number of 0 to 1 transitions from four to two. Although the bit sequence of the unmodified digital word is modified to generate the modified digital word, the number of 0 and 1 bit values from the unmodified digital word remains constant in the modified digital word.

The controller 450 determines 1125 a modified sequence of pulses for a PWM signal 430 by ordering the pulses of the PWM signal according to the bit sequence of the modified digital word and the associations between the bits of the unmodified digital word and the pulses of the unmodified PWM signal. The modified sequence of pulses correspond with the bit sequence of the modified digital word to preserve the total duration of the pulses within the pixel time, but changes the order of the pulses to reduce dynamic power consumption caused by charging of the capacitor 510. The modified sequence of pulses may include the same duty cycle as the sequence of pulses of the unmodified PWM signal, but with pulses arranged in different orders to charging of the capacitor 510, and thus improving dynamic power consumption.

The panel driver 420 provides 1130 the modified digital word to the control circuit 500 via the data signal 426 and the scan signal 428. For example, the controller 450 generates and provides the modified digital word to the panel driver 420, and the panel driver 420 programs the control circuit 500 using the modified digital word during the pixel time of the sub-pixel.

In some embodiments, the controller 450 generates the grayscale value and provides the grayscale value to the panel driver 420. The panel driver 420 determines the modified digital word from the grayscale value instead of the controller 450.

The PWM driver 424 provides 1130 the modified sequence of pulse5 to the control circuit 500 via the PWM signal 430. For example, the controller 450 provides the modified sequence of pulses to the PWM driver 422, and the PWM driver 422 drives the LED 502 of the control circuit 500 using modified sequence of pulses. Steps 1125 and 1130 may be performed concurrently to synchronize the programming of the control circuit 500 with corresponding bits of the modified digital word and the modified sequence of pulses to display the image.

In some embodiments, the controller 450 generates the grayscale value and provides the grayscale value to the PWM driver 422. The PWM driver 422 determines the modified sequence of pulses from the grayscale value instead of the controller 450.

Each sub-pixel of the electronic display 155 can be controlled using a modified digital word and modified series of pulses during a pixel time. For example, the PWM driver 422 provides the PWM signal 430 to the transistor 506 of the control circuit 500 for the sub-pixel. The PWM signal 430 includes the modified series of pulses as generated in the process 700. With reference to the pixel time 1000 shown in FIG. 10, for example, the PWM signal 430 is set to a low level within time $T_{RST}$ to turn off the transistor 506.

Within the time $T_{RST}$, the panel driver 420 sets the gate of the transistor 504 to a high level with the scan signal$_N$ 428 and sets the source of the transistor 504 to a voltage level corresponding with the LSB of the modified digital word. For example, if the LSB is 1, then the source of the transistor 504 and node A is set to a high Vdata value. If the LSB is 0, then the source of the transistor 504 and node A is set to a low Vdata value.

The capacitor 510 is charged to store Vdata across the terminals, and thus across the nodes A and B. The gate of the driving transistor 506 is connected to node A and thus receives Vdata.

If Vdata from the LSB satisfies a gate threshold voltage of the transistor 506, then the transistor 506 is turned on for the first pulse of the PWM signal 430. When the transistor 506 is turned on and the PWM signal 430 goes high as shown by the Pulse1 in the pixel time 1000, the LED 502 emits light. If Vdata from the LSB fails to satisfy the gate threshold voltage of the transistor 506, then the transistor 506 is turned off for the first pulse of the PWM signal 430. When the transistor 506 is turned off, the LED 502 does not emit light even when the PWM signal 430 goes high as shown by the Pulse1 in the pixel time 1000.

Within the time $T_{OFF1}$ in the pixel time 1000, the panel driver 420 sets the gate of the transistor 504 to a high level with the scan signal$_N$ 428 and sets the source of the transistor 504 to a voltage corresponding with the second LSB of the modified digital word. The capacitor 510 is charged to store Vdata from the second LSB across the terminals, and thus across the nodes A and B. If Vdata from the second LSB satisfies the gate threshold voltage of the transistor 506, then the transistor 506 is turned on for the second pulse of the PWM signal 430. When the transistor 506 is turned on and the PWM signal 430 goes high as shown by the Pulse2 in the pixel time 1000, the LED 502 emits light. If Vdata from the second LSB fails to satisfy the gate threshold voltage of the transistor 506, then the transistor 506 is turned off for the second pulse of the PWM signal 430. When the transistor 506 is turned off, the LED 502 does not emit light even when the PWM signal 430 goes high as shown by the Pulse2 in the pixel time 1000. The remaining bits of the modified digital word and the modified series of pulses can be used to drive the LED 502 in a similar fashion as discussed for the LSB and the second LSB.

Figure 12:
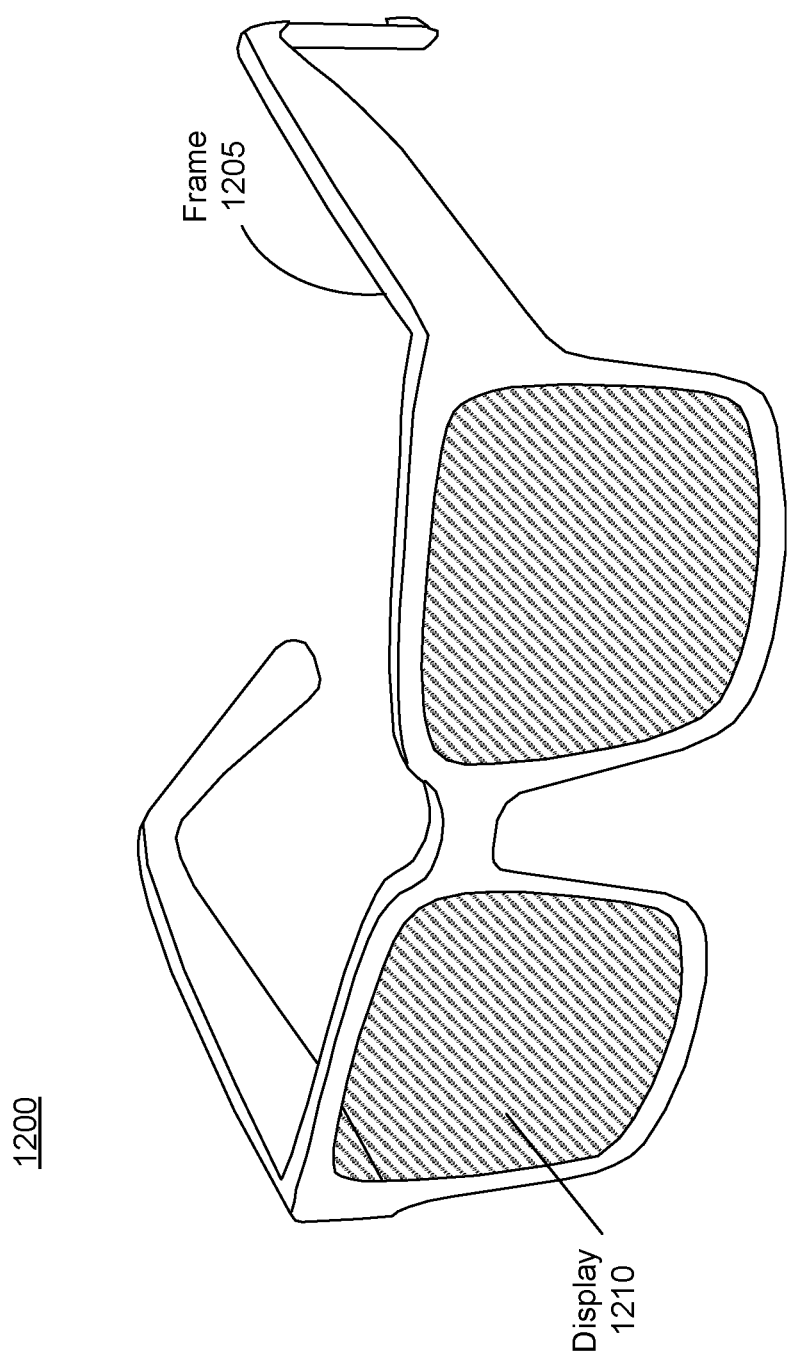
FIG. 12 is a schematic diagram of a near-eye display (NED), in accordance with one embodiment.

FIG. 12 is a schematic diagram of a near-eye-display (NED) 1200, in accordance with an embodiment. The NED 1200 presents media to a user, and is an example of the HMD 105. Examples of media presented by the NED 1200 include one or more images, video, audio, or some combination thereof. In some embodiments, audio is presented via an external device (e.g., speakers and/or headphones) that receives audio information from the NED 1200, a console (not shown), or both, and presents audio data based on the audio information. The NED 1200 is generally configured to operate as a VR NED. However, in some embodiments, the NED 1200 may be modified to also operate as an augmented reality (AR) NED, a mixed reality (MR) NED, or some combination thereof. For example, in some embodiments, the NED 1200 may augment views of a physical, real-world environment with computer-generated elements (e.g., images, video, sound, etc.).

The NED 1200 shown in FIG. 12 includes a frame 1205 and a display 1210. The frame 1205 is coupled to one or more optical elements which together display media to users. In some embodiments, the frame 1205 may represent a frame of eye-wear glasses. The display 1210 is configured for users to see the content presented by the NED 1200. The display 1210 is an example of an electronic display 155 including a multi-layer structure. As discussed below in conjunction with FIG. 13, the display 1210 includes at least one waveguide display assembly (not shown) for directing one or more image light to an eye of the user. The waveguide display assembly includes, e.g., a waveguide display, a stacked waveguide display, a varifocal waveguide display, or some combination thereof. The stacked waveguide display is a polychromatic display created by stacking waveguide displays whose respective monochromatic sources are of different colors.

Figure 13:
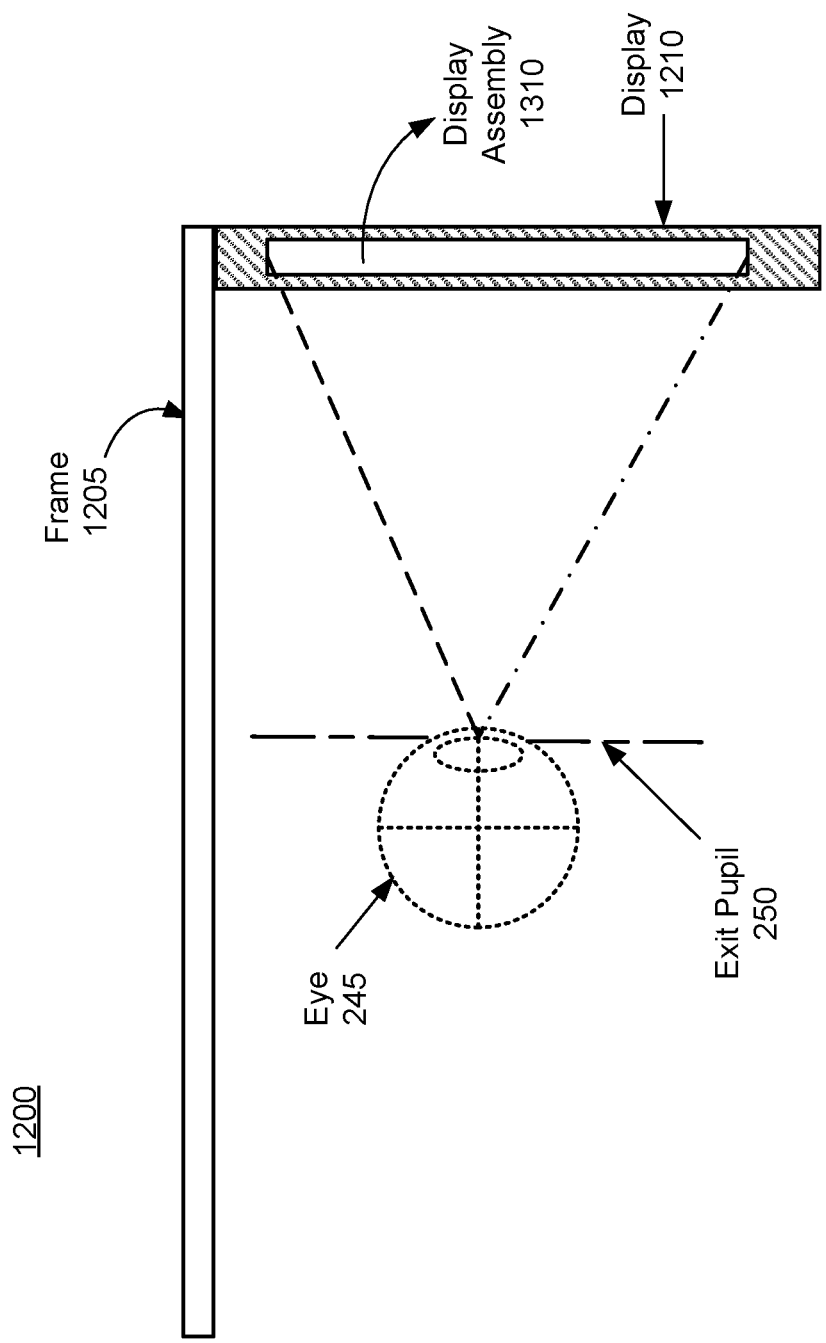
FIG. 13 is a cross-section of the NED illustrated in FIG. 12, in accordance with an embodiment.

FIG. 13 is a cross-section of the NED 1200 illustrated in FIG. 12, in accordance with an embodiment. The display 1210 includes at least one display assembly 1310. An exit pupil 250 is a location where the eye 245 is positioned when the user wears the NED 1200. For purposes of illustration, FIG. 13 shows the cross section associated with a single eye 245 and a single display assembly 1310, but in alternative embodiments not shown, another waveguide display assembly which is separate from the waveguide display assembly 1310 shown in FIG. 13, provides image light to another eye 245 of the user.

The display assembly 1310, as illustrated below in FIG. 13, is configured to direct the image light to the eye 245 through the exit pupil 250. The display assembly 1310 may be composed of one or more materials (e.g., plastic, glass, etc.) with one or more refractive indices that effectively minimize the weight and widen a field of view (hereinafter abbreviated as 'FOV') of the NED 1200. In alternate configurations, the NED 1200 includes one or more optical elements between the display assembly 1210 and the eye 245. The optical elements may act to, e.g., correct aberrations in image light emitted from the display assembly 1310, magnify image light emitted from the display assembly 1310, some other optical adjustment of image light emitted from the display assembly 1310, or some combination thereof. The example for optical elements may include an aperture, a Fresnel lens, a convex lens, a concave lens, a filter, or any other suitable optical element that affects image light.

In some embodiments, the display assembly 1310 includes a stack of one or more waveguide displays including, but not restricted to, a stacked waveguide display, a varifocal waveguide display, etc. The stacked waveguide display is a polychromatic display (e.g., a red-green-blue (RGB) display) created by stacking waveguide displays whose respective monochromatic sources are of different colors.

Figure 14:
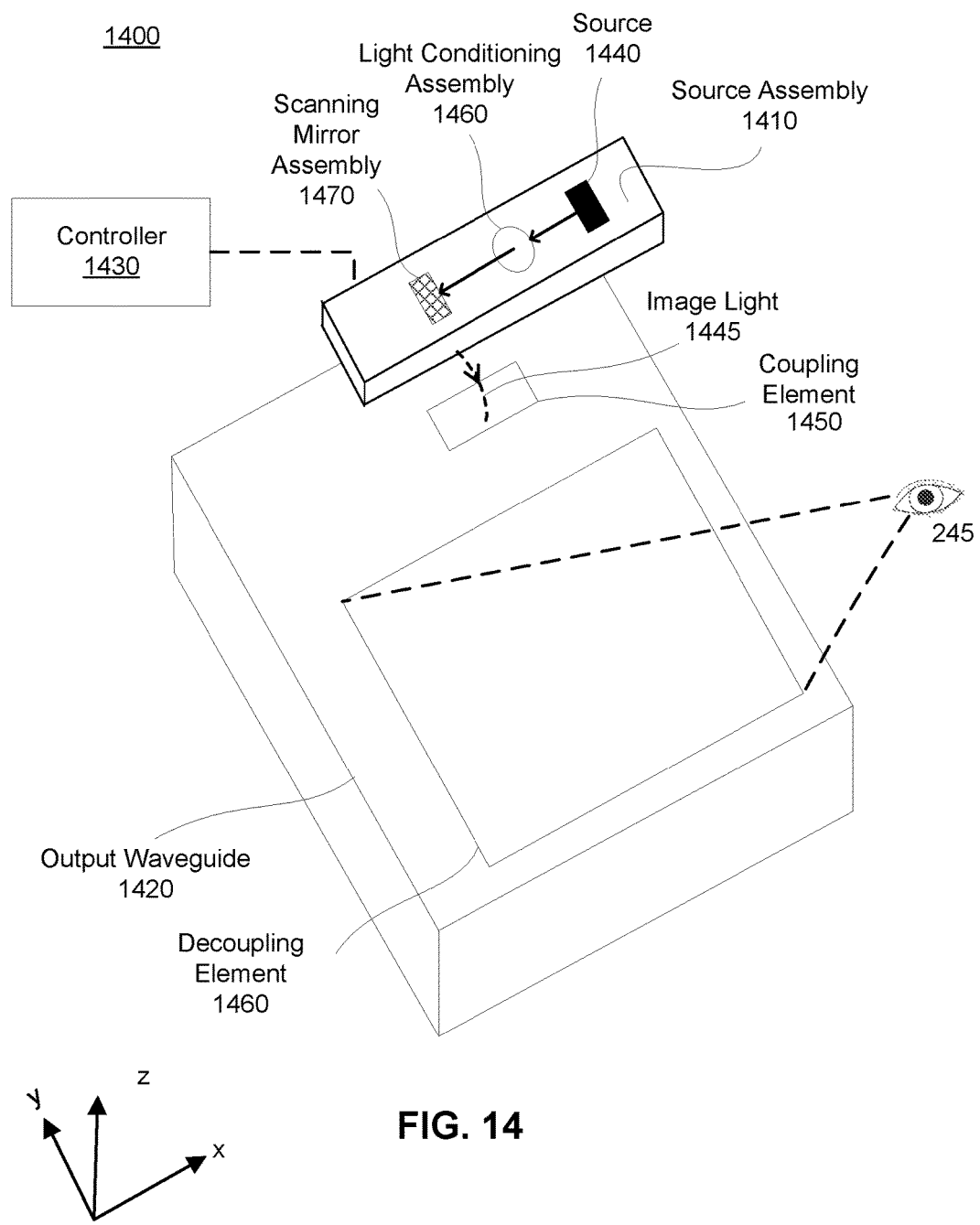
FIG. 14 is an isometric view of a waveguide display, in accordance with an embodiment.

FIG. 14 illustrates an isometric view of a waveguide display 1400, in accordance with an embodiment. In some embodiments, the waveguide display 1400 (may also be referred to as a scanning waveguide display) is a component (e.g., display assembly 1310) of the NED 1200. In alternate embodiments, the waveguide display 1400 is part of some other NED, or other system that directs display image light to a particular location.

The waveguide display 1400 includes a source assembly 1410, an output waveguide 1420, and a controller 1430. For purposes of illustration, FIG. 14 shows the waveguide display 1400 associated with a single eye 245, but in some embodiments, another waveguide display separate (or partially separate) from the waveguide display 1400, provides image light to another eye of the user. In a partially separate system, one or more components may be shared between waveguide displays for each eye.

The source assembly 1410 generates image light. The source assembly 1410 includes a source 1440, a light conditioning assembly 1460, and a scanning mirror assembly 1470, described in detail below with reference to FIG. 18. The source assembly 1410 generates and outputs image light 1445 to a coupling element 1450 of the output waveguide 1420.

The source 1440 is a source of light that generates at least a coherent or partially coherent image light. The source 1440 emits light in accordance with one or more illumination parameters received from the controller 1430. The source 1440 includes one or more source elements, including, but not restricted to MicroLEDs.

The output waveguide 1420 is an optical waveguide that outputs image light to an eye 245 of a user. The output waveguide 1420 receives the image light 1440 at one or more coupling elements 1450, and guides the received input image light to one or more decoupling elements 1460. In some embodiments, the coupling element 1450 couples the image light 1440 from the source assembly 1410 into the output waveguide 1420. The coupling element 1450 may be, e.g., a diffraction grating, a holographic grating, some other element that couples the image light 1440 into the output waveguide 1420, or some combination thereof. For example, in embodiments where the coupling element 1450 is diffraction grating, the pitch of the diffraction grating is chosen such that total internal reflection occurs, and the image light 1440 propagates internally toward the decoupling element 1460. For example, the pitch of the diffraction grating may be in the range of 300 nm to 600 nm.

The decoupling element 1460 decouples the total internally reflected image light from the output waveguide 1420. The decoupling element 1460 may be, e.g., a diffraction grating, a holographic grating, some other element that decouples image light out of the output waveguide 1420, or some combination thereof. For example, in embodiments where the decoupling element 1460 is a diffraction grating, the pitch of the diffraction grating is chosen to cause incident image light to exit the output waveguide 1420. An orientation and position of the image light exiting from the output waveguide 1420 is controlled by changing an orientation and position of the image light 1440 entering the coupling element 1450. For example, the pitch of the diffraction grating may be in the range of 300 nm to 600 nm.

The output waveguide 1420 may be composed of one or more materials that facilitate total internal reflection of the image light 1440. The output waveguide 1420 may be composed of e.g., silicon, plastic, glass, or polymers, or some combination thereof. The output waveguide 1420 has a relatively small form factor for a head-mounted display. For example, the output waveguide 1420 may be approximately 50 mm wide along X-dimension, 30 mm long along Y-dimension and 0.5-1 mm thick along Z-dimension. In some embodiments, the output waveguide 320 is a 2D optical waveguide.

The controller 1430 controls the scanning operations of the source assembly 1410. The controller 1430 determines scanning instructions for the source assembly 1410 based at least on the one or more display instructions. Display instructions are instructions to render one or more images. In some embodiments, display instructions may simply be an image file (e.g., bitmap). The display instructions may be received from, e.g., a console of a VR system (not shown here). Scanning instructions are instructions used by the source assembly 1410 to generate image light 1440. The scanning instructions may include, e.g., a type of a source of image light (e.g. monochromatic, polychromatic), a scanning rate, an orientation of a scanning mirror assembly, one or more illumination parameters, or some combination thereof. The controller 1430 includes a combination of hardware, software, and/or firmware not shown here so as not to obscure other aspects of the disclosure.

Figure 15:
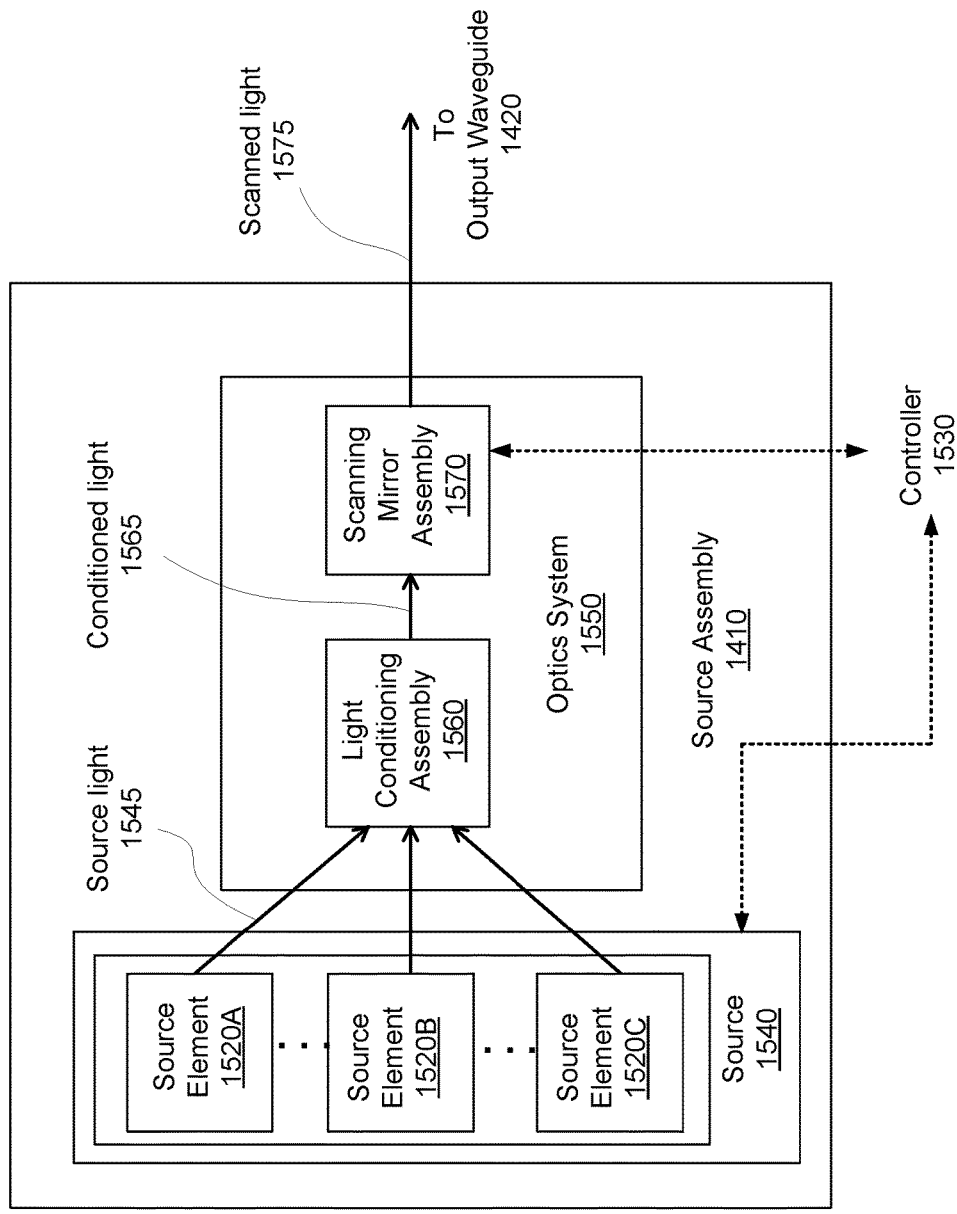
FIG. 15 is a block diagram of a source assembly with a 1D source, the source assembly outputting a scanned light, in accordance with an embodiment.

FIG. 15 is a block diagram of the source assembly 1410 of FIG. 14 with a 1D source, the source assembly 1410 outputting a scanned light, in accordance with an embodiment. The source assembly 1410 includes a source 1540, and an optics system 1550. The source 1540 is an embodiment of the source 1440 of FIG. 14. The optics system 1550 includes a light conditioning assembly 1560 and a scanning mirror assembly 1570. The light conditioning assembly 1560 is an embodiment of the light conditioning assembly 1460 of FIG. 14. The scanning mirror assembly 1570 is an embodiment of the scanning mirror assembly 1470 of FIG. 14. The source assembly 1410 generates light in accordance with scanning instructions from the controller 1430 of FIG. 14.

The source 1540 is a source of light that generates at least a coherent or partially coherent image light. The source 1540 emits light in accordance with one or more illumination parameters received from the controller 1430. The source 1540 includes one or more source elements 1520. The source element 1520 may be LEDs with at least ultra-high brightness, low power consumption, and a low footprint. The source element 1520 may be, e.g., MicroLEDs, organic LEDs (OLEDs), a superluminescent LED (SLED), and organic MicroLEDs. A MicroLED is a LED that can be made small such that light emission area can be made to the order of a micron to a few tens of microns. For example, GaN-based inorganic LEDs can be made orders of magnitude brighter than OLEDs with a light emission area of few microns. The source 1540 may be a 1D source, 2D source, or have some other dimension.

In one embodiment, the source element 1520 may be arranged in a concave curved and linear fashion. For example, the source 1540 may have a radius of curvature ranging from few millimeters to few centimeters depending on the display size and a length of few millimeters. An advantage of a curved array is that it is much easier for a compact lens to have high quality image on curved surface without correcting the field of curvature of the lens. In alternate embodiments, the source element 1520 may be arranged in a flat and linear fashion.

The source element 1520 emits a source light 1545 to the optics system 1550. In some embodiments, the source light 1545 may emit one or more colors (e.g. red, green, and blue). For example, the source element 1520A emits a red source light, the source element 1520B emits a blue source light, and the source element 1520C emits a green source light. Additionally, in some embodiments, one or more of the source elements may emit light in the infrared.

The optics system 1550 includes a light conditioning assembly 1560 and a scanning mirror assembly 1570. The light conditioning assembly 1560 conditions the source light 1545 and emits conditioned light to the scanning mirror assembly 1570. Conditioned light is light conditioned for incidence on the scanning mirror assembly 1570. The light conditioning assembly 1560 includes one or more optical components that condition the light from the source 1540. Conditioning light from the source 1540 may include, e.g., expanding, collimating, correcting for one or more optical errors (e.g., field curvature, chromatic aberration, etc.), some other adjustment of the light, or some combination thereof. The light conditioning assembly 1560 conditions the source light 1545 and emits conditioned light 1565 to the scanning mirror assembly 1570.

The scanning mirror assembly 1570 includes one or more optical elements that redirect image light via one or more reflective portions of the scanning mirror assembly 1570. Where the image light is redirected toward is based on specific orientations of the one or more reflective portions. In some embodiments, the scanning mirror assembly includes a single scanning mirror that is configured to scan in at least two dimensions. In other embodiments, the scanning mirror assembly 1570 may include a plurality of scanning mirrors that each scan in orthogonal directions to each other. The scanning mirror assembly 1570 may raster scan (horizontally, or vertically). In some embodiments, the scanning mirror assembly 1570 may perform a controlled vibration along the horizontal and/or vertical directions with a specific frequency of oscillation to scan along two dimensions and generate a two-dimensional projected line image of the media presented to user's eyes. For example, the scanning mirror assembly 1570 may undergo an oscillation with peak-to-peak amplitude of few hundreds of nanometers per second along the vertical direction based on the desired frequency of oscillation. The scanning mirror assembly 1570 emits a scanned light 1575 based on the conditioned light 1565. The scanning mirror assembly 1570 outputs the scanned light 1575 at a particular orientation (in accordance with the scanning instructions) toward the output waveguide 1420.

In some embodiments, the scanning mirror assembly 1570 includes a galvanometer mirror. For example, the galvanometer mirror may represent any electromechanical instrument that indicates that it has sensed an electric current by deflecting a beam of image light with one or more mirrors. The galvanometer mirror may be configured to scan in at least one orthogonal dimension to generate the scanned light 1575. The scanned light 1575 from the galvanometer mirror represents a two-dimensional line image of the media presented to user's eyes.

The controller 1430 controls the source 1540 and the scanning mirror assembly 1570. The controller 1430 takes content for display, and divides the content into discrete sections. The controller 1430 instructs the source 1540 to sequentially present the discrete sections. Each sub-pixel of the discrete section may be controlled using modified digital words and modified sequences of pulses of the PWM signal. Here, the controller 1530 is an example of the controller 450 shown in FIG. 4. The panel driver 420, PWM driver 422, and calibration driver 424 may be integrated with the controller 1530, or separate from the controller 1530, and are not shown in FIG. 15 for simplicity. The controller 1430 further instructs the scanning mirror assembly 1570 to scan the presented discrete sections to different areas of a coupling element of the output waveguide. Accordingly, at the exit pupil of the output waveguide 1420 each discrete portion is presented in a different location. While each discrete section is presented at different times, the presentation and scanning of the discrete sections occurs fast enough such that a user's eye integrates the different sections into a single image or series of images.

For example, in embodiments where the source 1540 includes a linear one-dimensional array of source elements 1520, the content is divided by the controller 1430 into lines where the lines are scanned out to different areas of the coupling element of the output waveguide 1420, such that, at the exit pupil of the output waveguide 1420 each of the lines are presented at a different location which a user's eye integrates into a single image or series of images.

Figure 16:
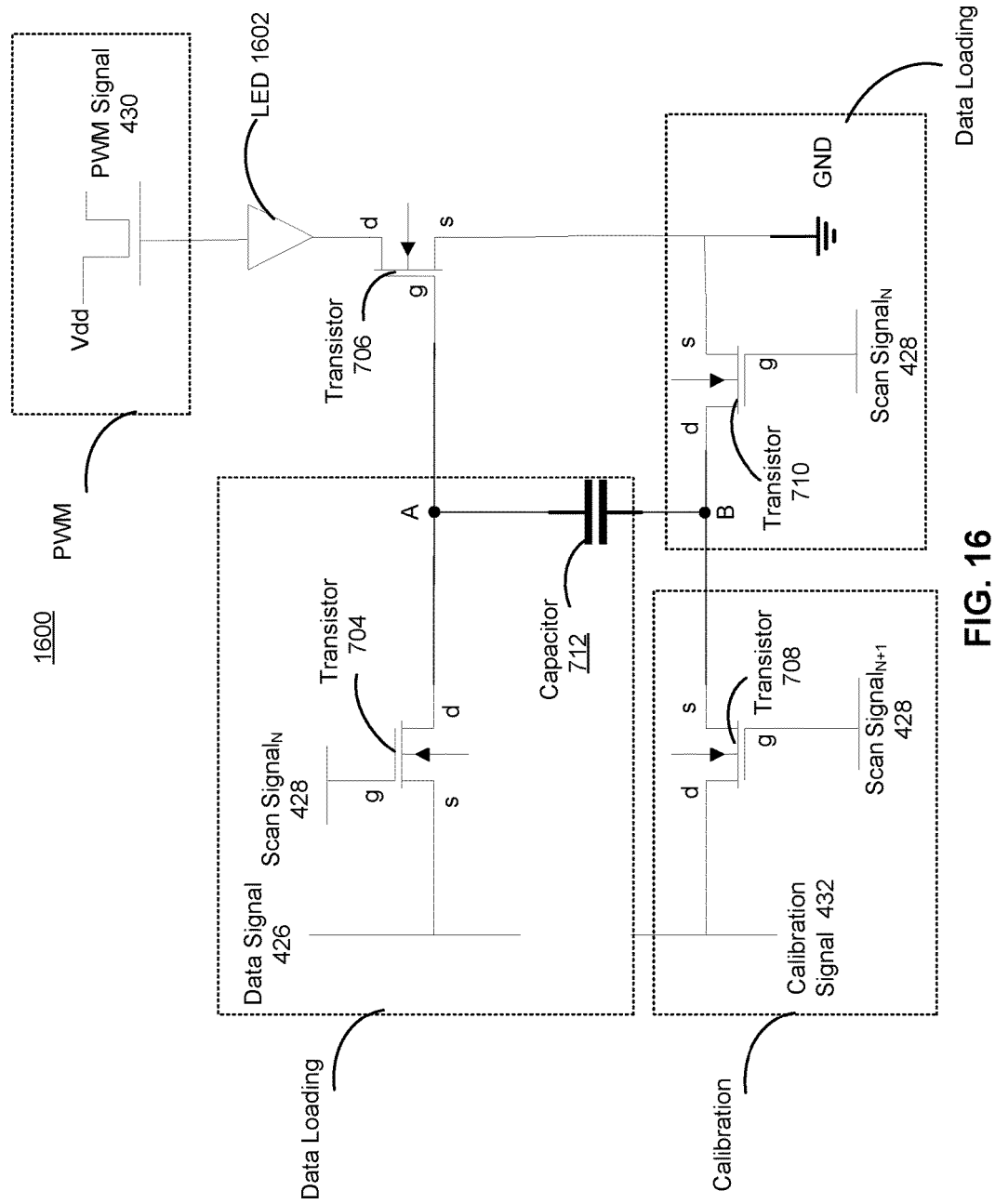
FIG. 16 is a schematic diagram of a control circuit for a sub-pixel of an electronic display, in accordance with one embodiment.

FIG. 16 is a schematic diagram of a control circuit 1600 for a sub-pixel of an electronic display, in accordance with one embodiment. The control circuit 1600 is similar to the control circuit 700, except that the LED 1602 is in a common anode topology. In the common anode topology, the LED 1602 is placed between the power supply Vdd and the drain of the driving transistor 706. In contrast, the LED 702 of the control circuit 700 is in a common cathode topology, with the LED 702 placed between the source of the driving transistor 706 and the reference voltage (GND).

Depending on whether the common cathode or common anode topography is used, the effective gate-to-source voltage (Vgs, eff) of the driving transistor 706 is different when Vdata is applied to the gate of the driving transistor 706. For the common cathode, the Vgs, eff of the driving transistor 706 is equal to Vdata−$V_{LED}$, where $V_{LED}$ is the voltage across the LED 702. For the common anode, the Vgs,eff of the driving transistor 706 is equal to Vdata. As such, for the same Vgs, eff (and same driving current for the LED), Vdata has to be higher for the common cathode topology compared to the common anode topology. Therefore, the common anode topology may be used to provide lower dynamic data power compared to the common cathode topology. In some embodiments, the control circuit 500 shown in FIG. 5 may also include an LED in the common anode topology rather than the common cathode topology shown in FIG. 5. The LED 502 may be placed between the power supply Vdd and the drain of the driving transistor 506.

The foregoing description of the embodiments has been presented for the purpose of illustration; it is not intended to be exhaustive or to limit the patent rights to the precise forms disclosed. Persons skilled in the relevant art can appreciate that many modifications and variations are possible in light of the above disclosure.

The language used in the specification has been principally selected for readability and instructional purposes, and it may not have been selected to delineate or circumscribe the inventive subject matter. It is therefore intended that the scope of the patent rights be limited not by this detailed description, but rather by any claims that issue on an application based hereon.

What is claimed is:

1. An electronic display, comprising:
   a display panel;
   a panel driver connected to the display panel;
   a pulse-width modulation (PWM) driver connected to the display panel; and
   a controller configured to:
   associate each bit of a grayscale value for a sub-pixel of the display panel with a pulse of a PWM signal, the PWM signal including a sequence of pulses;
   generate a modified digital word including a modified bit sequence by modifying a bit sequence of the grayscale value, the modified bit sequence including a fewer number of transitions from a first voltage level to a second voltage level higher than the first voltage level as defined from a least significant bit to a most significant bit than the bit sequence of the grayscale value, the modified bit sequence including a same number of bits as the bit sequence of the grayscale value;
   generate a modified PWM signal including a modified sequence of pulses by ordering the pulses of the PWM signal according to the modified bit sequence of the modified digital word and the associations between each bit of the grayscale value and each pulse of the sequence of pulses of the PWM signal;
   provide the modified digital word to the display panel via the panel driver; and
   provide the modified PWM signal to the display panel via the PWM driver.

2. The electronic display of claim 1, wherein the display panel includes a control circuit for the sub-pixel, the control circuit including a storage capacitor configured to store voltage levels of the modified digital word, the storage capacitor being connected at a node to a gate of a driving transistor that drives a light emitting diode (LED).

3. The electronic display of claim 2, wherein the storage capacitor is charged each time the modified bit sequence includes a transition from the first voltage level to the second voltage level as defined from the least significant bit to the most significant bit.

4. The electronic display of claim 2, wherein:
   a drain of the driving transistor is connected to the PWM driver to receive the modified PWM signal for driving the LED;
   the control circuit further includes a first transistor, a source of the first transistor connected to the panel driver to receive a data signal, a gate of the first transistor connected to the panel driver to receive a scan signal, a drain of the first transistor connected at the node to the gate of the driving transistor;
   the panel driver is configured to provide the modified digital word to the control circuit using the data signal and the scan signal; and
   the PWM driver is configured to provide the modified series of pulses to the control circuit using the modified PWM signal.

5. The electronic display of claim 2, wherein:
   the electronic display further includes a calibration driver connected to the display panel;

the storage capacitor is connected at the node with a drain of a first transistor, and connected at another node to a drain of a second transistor and a source of a third transistor;

the LED is connected to a source of the second transistor;

a drain of the driving transistor is connected to the PWM driver to receive the modified PWM signal for driving the LED;

the control circuit further includes:
- the first transistor, a source of the first transistor connected to the panel driver to receive a data signal, a gate of the first transistor connected to the panel driver to receive a scan signal;
- the second transistor, a gate of the second transistor being connected to panel driver to receive the scan signal; and
- the third transistor, a drain of the third transistor connected to the calibration driver and a gate of the third transistor connected to the panel driver to receive another scan signal;

the panel driver is configured to provide the modified digital word to the control circuit using the data signal and scan signal; and the PWM driver is configured to provide the modified series of pulses to the control circuit using the modified PWM signal.

6. The electronic display of claim 1, wherein the pulses of the sequence of the pulses have increasing duration, a longest pulse of the pulses being associated with a most significant bit of the grayscale value and a shortest pulse of the pulses being associated with a least significant bit of the grayscale value.

7. The electronic display of claim 6, wherein the modified sequence of the pulses includes a pulse having a longer duration followed by a pulse having a shorter duration than the pulse having the longer duration.

8. A head-mounted display (HMD), comprising:
a display panel;
a panel driver connected to the display panel;
a pulse-width modulation (PWM) driver connected to the display panel; and
a controller configured to:
- associate each bit of a grayscale value for a sub-pixel of the display panel with a pulse of a PWM signal, the PWM signal including a sequence of pulses;
- generate a modified digital word including a modified bit sequence by modifying a bit sequence of the grayscale value, the modified bit sequence including a fewer number of transitions from a first voltage level to a second voltage level higher than the first voltage level as defined from a least significant bit to a most significant bit than the bit sequence of the grayscale value, the modified bit sequence including a same number of bits as the bit sequence of the grayscale value;
- generate a modified PWM signal including a modified sequence of pulses by ordering the pulses of the PWM signal according to the modified bit sequence of the modified digital word and the associations between each bit of the grayscale value and each pulse of the sequence of pulses of the PWM signal;
- provide the modified digital word to the display panel via the panel driver; and
- provide the modified PWM signal to the display panel via the PWM driver.

9. The HMD of claim 8, wherein the display panel includes a control circuit for the sub-pixel, the control circuit including a storage capacitor configured to store voltage levels of the modified digital word, the storage capacitor being connected at a node to a gate of a driving transistor that drives a light emitting diode (LED).

10. The HMD of claim 9, wherein the storage capacitor is charged each time the modified bit sequence includes a transition from the first voltage level to the second voltage level as defined from the least significant bit to the most significant bit.

11. The HMD of claim 9, wherein:
a drain of the driving transistor is connected to the PWM driver to receive the modified PWM signal for driving the LED;
the control circuit further includes a first transistor, a source of the first transistor connected to the panel driver to receive a data signal, a gate of the first transistor connected to the panel driver to receive a scan signal, a drain of the first transistor connected at the node to the gate of the driving transistor;
the panel driver is configured to provide the modified digital word to the control circuit using the data signal and the scan signal; and
the PWM driver is configured to provide the modified series of pulses to the control circuit using the modified PWM signal.

12. The HMD of claim 9, wherein:
the electronic display further includes a calibration driver connected to the display panel;
the storage capacitor is connected at the node with a drain of a first transistor, and connected at another node to a drain of a second transistor and a source of a third transistor;
the LED is connected to a source of the second transistor;
a drain of the driving transistor is connected to the PWM driver to receive the modified PWM signal for driving the LED
the control circuit further includes
- the first transistor, a source of the first transistor connected to the panel driver to receive a data signal, a gate of the first transistor connected to the panel driver to receive a scan signal;
- the second transistor, a gate of the second transistor being connected to panel driver to receive the scan signal; and
- the third transistor, a drain of the third transistor connected to the calibration driver and a gate of the third transistor connected to the panel driver to receive another scan signal;

the panel driver is configured to provide the modified digital word to the control circuit using the data signal and scan signal; and the PWM driver is configured to provide the modified series of pulses to the control circuit using the modified PWM signal.

13. The electronic display of claim 8, wherein the pulses of the sequence of the pulses have increasing duration, a longest pulse of the pulses being associated with a most significant bit of the grayscale value and a shortest pulse of the pulses being associated with a least significant bit of the grayscale value.

14. The electronic display of claim 13, wherein the modified sequence of the pulses includes a pulse having a longer duration followed by a pulse having a shorter duration than the pulse having the longer duration.

15. A method for controlling an electronic display, comprising:

associating each bit of a grayscale value for a sub-pixel of a display panel of the electronic display with a pulse of a pulse-width modulation (PWM) signal, the PWM signal including a sequence of pulses;

generating a modified digital word including a modified bit sequence by modifying a bit sequence of the grayscale value, the modified bit sequence including a fewer number of transitions from a first voltage level to a second voltage level higher than the first voltage level as defined from a least significant bit to a most significant bit than the bit sequence of the grayscale value, the modified bit sequence including a same number of bits as the bit sequence of the grayscale value;

generating a modified PWM signal including a modified sequence of pulses by ordering the pulses of the PWM signal according to the modified bit sequence of the modified digital word and the associations between each bit of the grayscale value and each pulse of the sequence of pulses of the PWM signal;

providing the modified digital word to the display panel via a panel driver; and providing the modified PWM signal to the display panel via a PWM driver.

16. The method of claim 15, wherein the display panel includes a control circuit for the sub-pixel, the control circuit including:
   a storage capacitor storing voltage levels of the modified digital word, the storage capacitor being connected at a node to a gate of a driving transistor that drives a light emitting diode (LED); and
   the LED connected to a source of the driving transistor.

17. The method of claim 14, wherein the storage capacitor is charged each time the modified bit sequence includes a transition from the first voltage level to the second voltage level as defined from the least significant bit to the most significant bit.

18. The method of claim 16, wherein:
   a drain of the driving transistor is connected to the PWM driver to receive the modified PWM signal for driving the LED;
   the control circuit further includes a first transistor, a source of the first transistor connected to the panel driver to receive a data signal, a gate of the first transistor connected to the panel driver to receive a scan signal, a drain of the first transistor connected at the node to the gate of the driving transistor; and
   the method further includes:
      providing, by the panel driver, the modified digital word to the control circuit using the data signal and the scan signal; and
      providing, by the PWM driver, the modified series of pulses to the control circuit using the modified PWM signal.

19. The method of claim 16, wherein:
a calibration driver is connected to the display panel;
the storage capacitor is connected at the node with a drain of a first transistor, and connected at another node to a drain of a second transistor and a source of a third transistor;
the LED is connected to a source of the second transistor;
a drain of the driving transistor is connected to the PWM driver to receive the modified PWM signal for driving the LED;
the control circuit further includes
   the first transistor, a source of the first transistor connected to the panel driver to receive a data signal, a gate of the first transistor connected to the panel driver to receive a scan signal;
   the second transistor; a gate of the second transistor being connected to panel driver to receive the scan signal; and
   the third transistor, a drain of the third transistor connected to the calibration driver and a gate of the third transistor connected to the panel driver to receive another scan signal; and
the method further includes:
   providing, by the panel driver, the modified digital word to the control circuit using the data signal and scan signal; and
   providing, by the PWM driver, the modified series of pulses to the control circuit using the modified PWM signal.

20. The method of claim 15, wherein:
the PWM signal includes a sequence of the pulses having increasing duration, a longest pulse of the pulses being associated with a most significant bit of the grayscale value and a shortest pulse of the pulses being associated with a least significant bit of the grayscale value; and
the modified sequence of the pulses includes a pulse having a longer duration followed by a pulse having a shorter duration.

* * * * *